(12) United States Patent
Mizutani et al.

(10) Patent No.: US 10,987,555 B2
(45) Date of Patent: *Apr. 27, 2021

(54) GOLF CLUB

(71) Applicant: SUMITOMO RUBBER INDUSTRIES, LTD., Kobe (JP)

(72) Inventors: Naruhiro Mizutani, Kobe (JP); Takashi Nakamura, Kobe (JP); Kenji Takasu, Kobe (JP); Daisuke Kohno, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,228

(22) Filed: Apr. 3, 2020

(65) Prior Publication Data

US 2020/0338410 A1    Oct. 29, 2020

(30) Foreign Application Priority Data

Apr. 26, 2019  (JP) .............................. JP2019-086804

(51) Int. Cl.
*A63B 53/00* (2015.01)
*A63B 53/14* (2015.01)
(Continued)

(52) U.S. Cl.
CPC .............. *A63B 53/14* (2013.01); *A63B 53/04* (2013.01); *A63B 60/14* (2015.10); *A63B 60/16* (2015.10);
(Continued)

(58) Field of Classification Search
CPC ......... A63B 53/14; A63B 53/04; A63B 60/14; A63B 60/16; A63B 53/047;
(Continued)

(56) References Cited

U.S. PATENT DOCUMENTS 4,600,195 A * 7/1986 Hunter .................... A63B 60/24
                                                 473/297
4,674,746 A * 6/1987 Benoit .................... A63B 60/24
                                                 30/308.1

(Continued)

FOREIGN PATENT DOCUMENTS

| JP | 2006025935 A | * | 2/2006 |
| JP | 2006312013 A | * | 11/2006 |
| JP | 6305611 B1 | | 4/2018 |

*Primary Examiner* — Stephen L Blau

(74) *Attorney, Agent, or Firm* — Birch, Stewart, Kolasch & Birch, LLP

(57) ABSTRACT

A golf club includes a head; a shaft having a tip end and a butt end; a grip; and a weight member that is located in a butt end region having a distance from a butt end of the grip of 100 mm or less. The grip and the weight member constitute a grip-weight portion. The shaft, the grip, and the weight member constitute a shaft-grip-weight portion. The golf club has a weight of less than 295 g. The head has a weight of greater than or equal 195 g. The grip-weight portion has a weight of greater than or equal to 40 g. The head has a gravity center distance of greater than or equal to 44.5 mm. A ratio W1/W3 of a weight W1 (g) of the butt end region to a weight W3 (g) of the shaft-grip-weight portion is greater than or equal to 0.40.

17 Claims, 10 Drawing Sheets

(51) Int. Cl.
  *A63B 53/04* (2015.01)
  *A63B 60/14* (2015.01)
  *A63B 60/16* (2015.01)
  *B29D 99/00* (2010.01)

(52) U.S. Cl.
  CPC ......... *A63B 53/047* (2013.01); *A63B 53/0466* (2013.01); *A63B 53/0487* (2013.01); *A63B 2209/023* (2013.01); *B29D 99/00* (2013.01)

(58) Field of Classification Search
  CPC .......... A63B 53/0487; A63B 2209/023; A63B 53/0466; B29D 99/00
  See application file for complete search history.

(56) References Cited

U.S. PATENT DOCUMENTS

| | | | | |
|---|---|---|---|---|
| 4,887,815 A * | 12/1989 | Hughes | ................ | A63B 53/00 473/291 |
| 5,769,414 A * | 6/1998 | Feche | ................ | A63B 53/14 473/300 |
| 6,007,431 A * | 12/1999 | Bloom, Jr. | ............. | A63B 60/00 473/292 |
| 7,399,235 B2 * | 7/2008 | Gill | ................ | A01K 87/08 473/297 |
| 8,216,085 B2 * | 7/2012 | Fujimoto | ............... | A63B 53/00 473/292 |
| 8,814,717 B2 * | 8/2014 | Yashiki | .............. | A63B 53/0466 473/292 |
| 8,870,676 B2 * | 10/2014 | Takeuchi | ........... | A63B 53/0466 473/297 |
| 8,926,444 B2 * | 1/2015 | Kato | ................. | A63B 69/3632 473/202 |
| 2006/0142093 A1 * | 6/2006 | Moriyama | ........ | A63B 53/0466 473/292 |
| 2011/0159982 A1 * | 6/2011 | Takeuchi | .......... | A63B 60/22 473/299 |
| 2015/0045136 A1 * | 2/2015 | Boccieri | ................ | A63B 53/14 473/297 |
| 2019/0009155 A1 | 1/2019 | Mizutani et al. | | |

* cited by examiner

GOLF CLUB

This application claims priority on Patent Application No. 2019-086804 filed in JAPAN on Apr. 26, 2019. The entire contents of this Japanese Patent Application are hereby incorporated by reference.

BACKGROUND OF THE INVENTION

Field of the Invention

The present disclosure relates to a golf club.

Description of the Related Art

Japanese Patent No. 6305611 (US2019/0009155A1) proposes a golf club that is capable of improving the stability of swing.

SUMMARY OF THE INVENTION

The inventors of the present disclosure have obtained new knowledge on influences of a golf club on swing. The present disclosure provides a golf club that is capable of improving swing, and has excellent ball catchability.

In one aspect, a golf club includes a head; a shaft including a tip end and a butt end; a grip; and a weight member that is located in a butt end region having a distance from a butt end of the grip of less than or equal to 100 mm. The grip and the weight member constitute a grip-weight portion. The shaft, the grip, and the weight member constitute a shaft-grip-weight portion. The golf club has a weight of less than 295 g. The head has a weight of equal to or greater than 195 g. The grip-weight portion has a weight of greater than or equal to 40 g. The head has a gravity center distance of greater than or equal to 44.5 mm. W1/W3 is greater than or equal to 0.40, where W1 represents a weight (g) of the butt end region, and W3 represents a weight (g) of the shaft-grip-weight portion.

DESCRIPTION OF THE PREFERRED EMBODIMENTS (Knowledge as Basis of Present Disclosure)

The inventors of the present disclosure studied influences of a golf club on swing. As a result, they have found that a club and hands could go out of a swing plane, due to specifications of the club. Further, they have found that the motion of going out of the swing plane could cause impact with an open face. As a result, they have found a golf club that is capable of preventing the club and hands from going out of a swing plane.

The swing plane is a widely known concept for explaining a mechanism of a swing. Generally, the swing plane is a virtual plane that passes through a straight line that connects a ball and a target, as well as both shoulders (or elbows) at address. It is known that the motion of a club and hands being on this swing plane stabilizes the path of swing, which is likely to lead to a good shot. The word "hands" used herein means the right and left hands that hold a grip.

From the viewpoint of ease-of-swing, a club has been increasingly lightweighted. In this effort of lightweighting a club, the weight of the shaft and grip is reduced. On the other hand, as the rebound performance deteriorates if the head is too light, the head weight is maintained at or above a certain level.

It has been considered that whether or not a golfer can make a swing on the swing plane depends on the golfer's skill. The studies by the inventors of the present disclosure consequently proved that in the conventional lightweighted club, the club and hands tend to go out of the swing plane in a swinging motion. Further, the inventors found that this phenomenon relates to the face orientation at impact. The present disclosure is based on this new knowledge.

Hereinafter, the present disclosure will be described in detail according to the preferred embodiments with appropriate references to the accompanying drawings.

It should be noted that the term "axial direction" used in the present application means the axial direction of the shaft.

Figure 1:
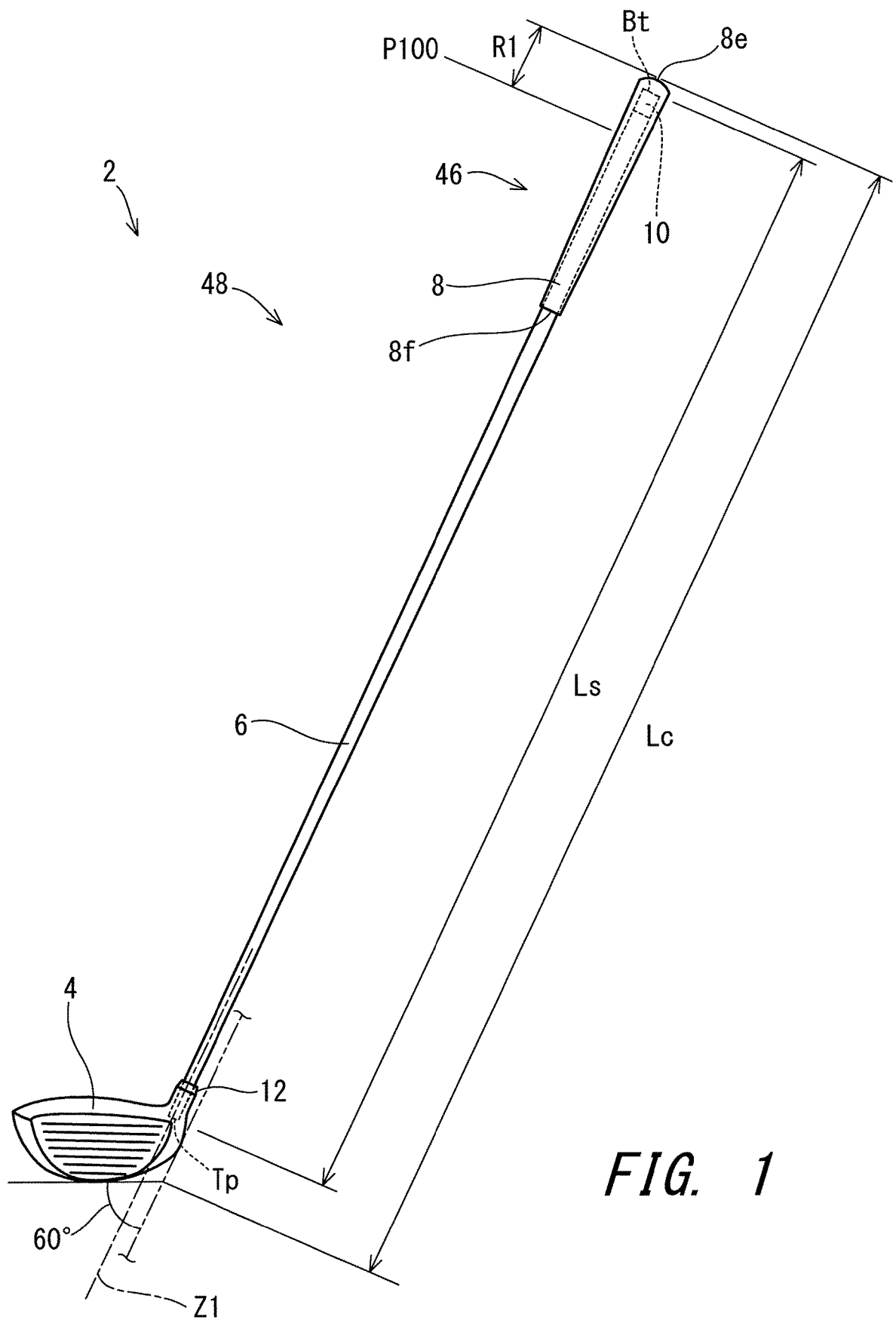
FIG. 1 shows a golf club according to one embodiment.

FIG. 1 shows an overall view of a golf club 2, which shows an embodiment of the present disclosure. As shown in FIG. 1, the golf club 2 includes a golf club head 4, a shaft 6, a grip 8, and a weight member 10. The weight member 10 is located inside the grip 8. Further, the golf club 2 includes a ferrule 12.

The golf club 2 is a driver (No. 1 wood). Typically, the club as a driver has a length of greater than or equal to 43 inches. Preferably, the golf club 2 is a wood-type golf club.

A bidirectional arrow Lc in FIG. 1 indicates a length of the golf club 2. The method for measuring the club length Lc is described below.

The golf club 2 includes a butt end region R1. The butt end region R1 is defined as a region having a distance from a butt end 8e of the grip 8 of less than or equal to 100 mm. In other words, the butt end region R1 is a region that extends from a point P100 that is 100 mm away from the butt end 8e of the grip 8 in the axial direction, to the butt end 8e of the grip 8.

In the present embodiment, the head 4 has a hollow structure. The head 4 is of a wood type. The head 4 may be of a hybrid type (utility type). The head 4 may be of an iron type. The head 4 may be of a putter type. Examples of the material for the head 4 include metals and fiber reinforced plastics. Examples of the metals include titanium alloys, pure titanium, stainless steel, and soft iron. Examples of the fiber reinforced plastics include carbon fiber reinforced plastics. The head may be a composite head that has a metal part and a fiber reinforced plastic part.

The head 4 is attached to an end on a tip end Tp side of the shaft 6. The grip 8 is attached to an end on a butt end Bt side of the shaft 6. The head 4 has a head weight Wh.

The shaft 6 is formed with a laminate of fiber reinforced resin layers. The shaft 6 is in a tubular form. The shaft 6 has a hollow structure. As shown in FIG. 1, the shaft 6 includes the tip end Tp and the butt end Bt. The tip end Tp is positioned inside the head 4. The butt end Bt is positioned inside the grip 8.

The shaft 6 has a shaft weight Ws.

A bidirectional arrow Ls in FIG. 1 indicates a length of the shaft. The shaft length Ls is a distance in the axial direction from the tip end Tp to the butt end Bt.

The material of the shaft 6 is a carbon fiber reinforced resin. With a view to reducing the weight, a carbon fiber reinforced resin is preferable as a material for the shaft 6. The shaft 6 is a so-called carbon shaft. Preferably, the shaft 6 is formed with a cured prepreg sheet. In the prepreg sheet, fibers are substantially oriented in one direction. Such a prepreg in which fibers are substantially oriented in one direction is also referred to as UD prepreg. "UD" is an abbreviation of "unidirectional". A prepreg other than the UD prepreg may be used. For example, fibers contained in the prepreg sheet may be woven. The shaft 6 may include a metal wire.

The prepreg sheet contains fibers and a resin. This resin is also referred to as a matrix resin. Typically, the fibers are carbon fibers. Typically, the matrix resin is a thermosetting resin.

The shaft 6 is produced by a so-called sheet winding method. In the prepreg, the matrix resin is in a semi-cured state. The shaft 6 is formed by winding and curing a prepreg sheet. The shaft 6 may be produced by a so-called filament winding method.

As the matrix resin of the prepreg sheet, an epoxy resin, a thermosetting resin other than an epoxy resin, or a thermoplastic resin, etc. may be used. From the viewpoint of shaft strength, a preferable matrix resin is an epoxy resin.

The method for producing the shaft 6 is not limited. From the viewpoint of design freedom, a shaft produced by the sheet winding method is preferred. Note that the material for the shaft 6 is not limited. The shaft 6 may be, for example, a steel shaft.

The grip 8 is a part that a golfer grips in a swinging motion. The grip 8 has a grip weight Wg.

Examples of the material of the grip 8 include rubber compositions and resin compositions. Examples of rubber contained in the rubber composition include natural rubber (NR), ethylene propylene diene monomer rubber (EPDM), styrene butadiene rubber (SBR), isoprene rubber (IR), butadiene rubber (BR), chloroprene rubber (CR), and acrylonitrile butadiene rubber (NBR). In particular, natural rubber, or natural rubber blended with a rubber having excellent affinity for natural rubber, such as ethylene propylene diene rubber or styrene butadiene rubber, is preferable. Examples of resin contained in the resin composition include a thermoplastic resin. The thermoplastic resin can be used in injection forming. This thermoplastic resin is preferably a thermoplastic elastomer, and more preferably a thermoplastic elastomer containing a soft segment and a hard segment. With a view to achieving both of the desired grip property and the abrasion resistance, urethane-based thermoplastic elastomer is further preferable. From the viewpoint of formability, EPDM and styrene butadiene rubber are more preferable.

The rubber composition for the grip 8 may be a foam rubber. A foam rubber contains many air bubbles, thereby having a low specific gravity. A foaming agent may be mixed in the foam rubber. One example of this foaming agent is a thermally decomposable foaming agent. Examples of this thermally decomposable foaming agent include azo compounds such as azodicarbonamide, nitroso compounds such as dinitrosopentamethylene tetramine, and triazole compounds. The foam rubber contributes to the lightweighting of the grip 8.

A plurality of types of rubbers having different expansion ratios may be used. Examples of the rubbers having different expansion ratios may include a non-foam rubber (having an expansion ratio of zero). By adjusting the arrangement of the plurality of types of rubbers, the position of a center of gravity G2 of a grip-weight portion (to be described below) can be adjusted.

The method for producing the grip 8 is not limited. The grip 8 can be produced by a known producing method. Examples of the producing method include press-forming and injection forming.

When a plurality of types of rubbers having different expansion ratios are used, press-forming is preferred. In this case, for example, a rubber sheet 1 made of a material formed at a first expansion ratio, and a rubber sheet 2 made of a material formed at a second expansion ratio, are prepared. These sheets are placed at arbitrary positions in a mold, respectively, and are heated and pressurized, whereby press-forming is performed. In this method, rubbers having different expansion ratios can be arranged independently and freely.

The weight member 10 is located inside the grip 8. The weight member 10 is attached to the shaft 6. The weight member 10 is attached in the vicinity of the butt end Bt of the shaft 6. The weight member 10 is attached in the butt end region R1 described above. An entirety of the weight member 10 is positioned in the butt end region R1. The center line of the weight member 10 coincides with the center line Z1 of the shaft 6.

The weight member 10 may be attached to the shaft 6, or alternatively, may be attached to the grip 8. The weight member 10 in the present embodiment is not exposed to outside. At least a part of the weight member 10 may be exposed to outside.

Figure 2:
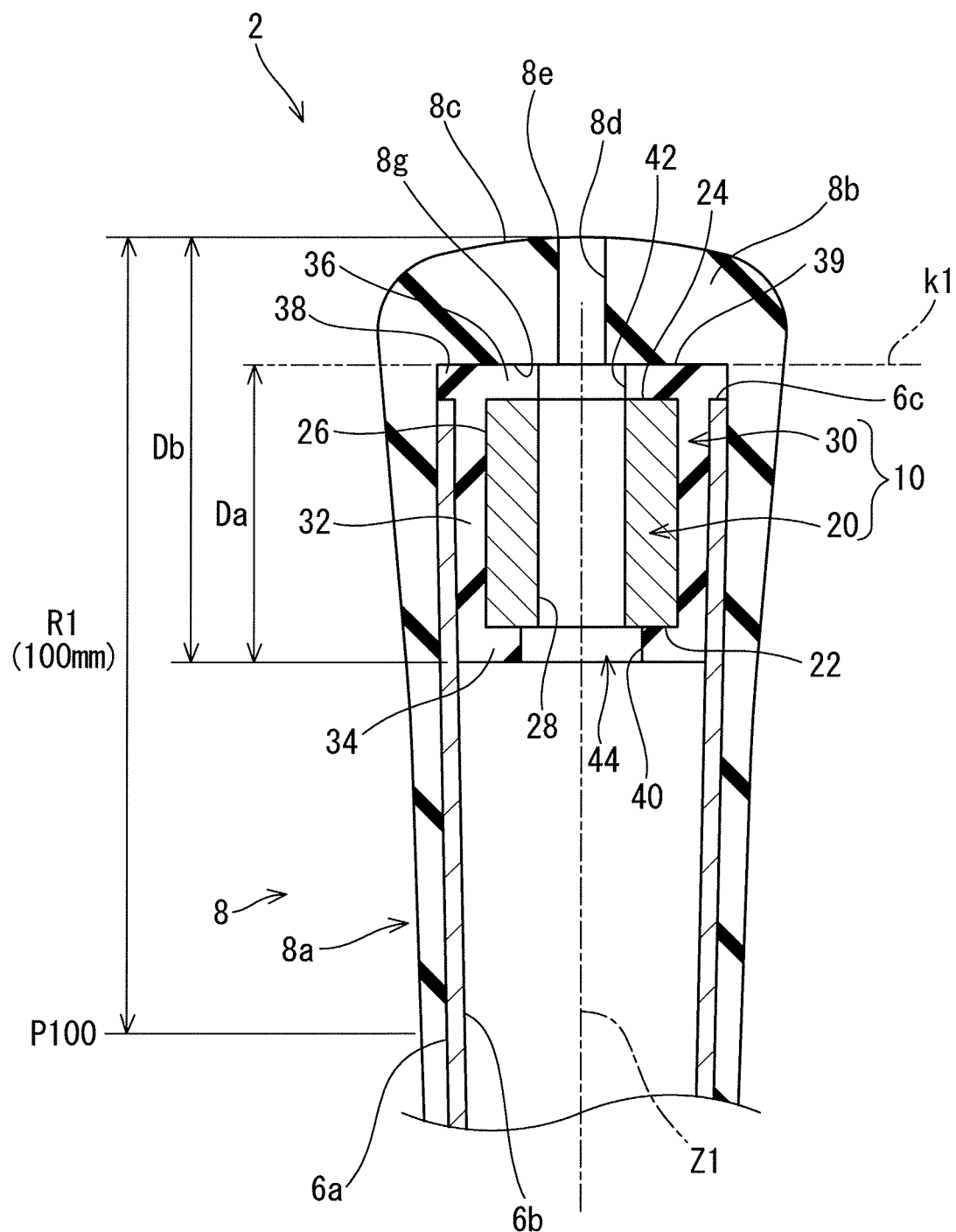
FIG. 2 is a cross-sectional view of the golf club shown in FIG. 1, taken in the vicinity of a grip butt end.

FIG. 2 is a cross-sectional view of the golf club 2, taken in the vicinity of the butt end Bt of the shaft 6.

The shaft 6 is a pipe having a hollow inside. When viewed in a cross section taken along a plane perpendicular to the center line of the shaft 6, an outer surface 6a of the shaft 6 is circular. When viewed in the cross section taken along a plane perpendicular to the center line of the shaft 6, an inner surface 6b of the shaft 6 is circular. The shaft 6 includes a butt end face 6c. The butt end face 6c is an end face of the shaft 6 at the butt end Bt. The butt end face 6c is an annular surface.

The grip 8 is attached on the butt end Bt side of the shaft 6. The grip 8 includes a grip body portion 8a and an end cap portion 8b. The grip body portion 8a is in a cylindrical shape. The grip body portion 8a includes a shaft insertion hole into which the shaft 6 is to be inserted. The end cap portion 8b closes an opening on one end side of the grip body portion 8a. The end cap portion 8b forms a butt end face 8c of the grip 8. The grip body portion 8a includes a taper portion that tapers off as the proximity to the end face 8c decreases. On the other end side of the grip body portion 8a, an opening (not shown) that allows the shaft 6 to be inserted therethrough is formed. The end cap portion 8b includes a through hole 8d. The through hole 8d has a function of releasing air when the shaft 6 is inserted into the grip 8.

The two-dot chain line in FIG. 2 indicates a boundary k1 between the grip body portion 8a and the end cap portion 8b. This boundary k1 is a plane that is positioned at a butt end of the shaft insertion hole and is perpendicular to the center line Z1. For example, at the position of this boundary k1, the grip body portion 8a and the end cap portion 8b are separated. The end cap portion 8b is positioned on the butt end 8e side with respect to the grip body portion 8a. In the present embodiment, the end cap portion 8b is formed with a non-foam rubber exclusively. On the other hand, the grip body portion 8a includes a foam rubber portion made of a foam rubber. This foam rubber portion contains many air bubbles, thereby having a low specific gravity. The end cap portion 8b has a specific gravity greater than the specific gravity (average specific gravity) of the grip body portion 8a. This configuration makes a contribution in allowing the center of gravity of the grip 8 to be set closer to the butt end 8e.

Figure 3:
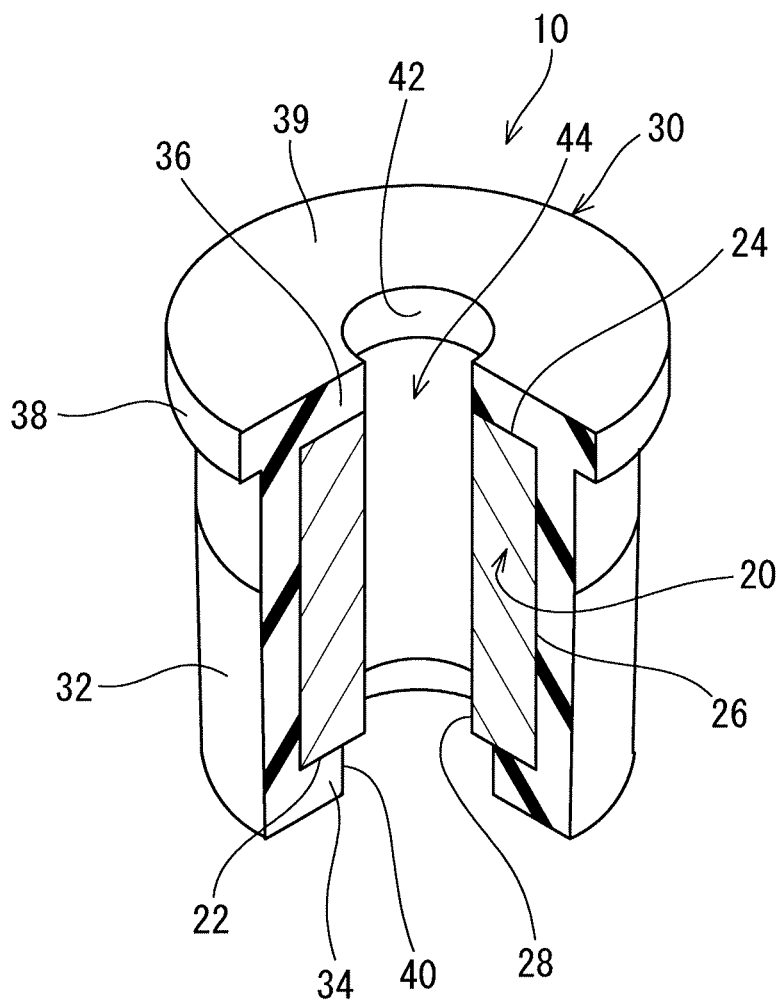
FIG. 3 is a partially cut-away perspective view of a weight member.

FIG. 3 is a perspective view of the weight member 10.

The weight member 10 includes a weight body 20 and a cover member 30. The weight body 20 is made of a metal. The cover member 30 is made of a rubbery elastomer. The weight body 20 can be formed by casting, forging, sintering, die casting, press forming, or the like. The cover member 30 can be formed by injection forming, or the like. With use of a mold in which a formed weight body 20 is set, the cover member 30 can be formed by injection forming. Alternatively, the weight body 20 and the cover member 30, which are formed separately, can be joined to each other.

The metal material for the weight body 20 is not limited particularly. With a view to obtaining the effect of being on the swing plane (also referred to as an "on-plane effect", which is to be described below) with a small volume, the weight body 20 preferably has a specific gravity of greater than or equal to 5.0, more preferably greater than or equal to 7.0, and further preferably greater than or equal to 8.0. From the viewpoint of the cost and the formability, the weight body 20 preferably has a specific gravity of less than or equal to 20, more preferably less than or equal to 18, and further preferably less than or equal to 15. In the present embodiment, brass is used for forming the weight body 20. An alloy containing tungsten and nickel can also be used favorably.

With a view to increasing a weight W1 of the butt end region R1, the weight of the weight member 10 is preferably greater than or equal to 6 g, more preferably greater than or equal to 8 g, and further preferably greater than or equal to 10 g. With a view to preventing a club weight We from becoming excessively great, the weight of the weight member 10 is preferably less than or equal to 25 g, more preferably less than or equal to 20 g, and further preferably less than or equal to 15 g.

The weight body 20 includes a first end face 22, a second end face 24, and an outer circumferential surface 26. The first end face 22 is positioned on the tip end Tp side, and the second end face 24 is positioned on the butt end Bt side, in the shaft axial direction. In the present embodiment, the first end face 22 and the second end face 24 are formed by planes perpendicular to the shaft axial direction; however, these are not limited to such configurations.

The outer circumferential surface 26 of the weight body 20 is a cylindrical surface. The center line of the outer circumferential surface 26 coincides with the center line Z1 of the shaft 6. A through hole 28 extending in the shaft axial direction is formed in the weight body 20. Therefore, the weight body 20 in the present embodiment is formed in a cylindrical shape.

The cover member 30 covers the weight body 20. The cover member 30 is made of a rubbery elastomer. The rubbery elastomer is a material having a rubbery elasticity, and examples of the same include a vulcanized rubber, as well as resin-based materials. The cover member 30 in the present embodiment is made of a vulcanized rubber.

The cover member 30 includes a side cover 32, a first end cover 34, a second end cover 36, and a flange portion 38. The side cover 32 covers the outer circumferential surface 26 of the weight body 20. The side cover 32 covers an entirety of the outer circumferential surface 26 of the weight body 20. The side cover 32 is configured to cover an entirety in the circumferential direction and in the shaft axial direction of the outer circumferential surface 26 of the weight body 20. The side cover 32 is in a cylindrical shape.

The first end cover 34 is continuous with the side cover 32. The first end cover 34 covers the first end face 22 of the weight body 20. The first end cover 34 covers a part of the first end face 22 of the weight body 20. Furthermore, a first through hole 40 that is continuous with the center through hole 28 in the weight body 20 is formed in the first end cover 34. The center line of the first through hole 40 coincides with the center line of the center through hole 28.

The second end cover 36 is continuous with the side cover 32. The second end cover 36 covers the second end face 24 of the weight body 20. The second end cover 36 covers an entirety of the second end face 24 of the weight body 20. Furthermore, a second through hole 42 that is continuous with the center through hole 28 in the weight body 20 is formed in the second end cover 36. The center line of the second through hole 42 coincides with the center line of the center through hole 28.

A weight through hole 44 that penetrates through the weight member 10 is composed of the through hole 28 of the weight body 20, the first through hole 40, and the second through hole 42. As shown in FIG. 2, the weight through hole 44 is continuous with the through hole 8d formed in the end cap portion 8b.

The flange portion 38 is continuous with the second end cover 36. The flange portion 38 protrudes from the second end cover 36 toward outside in the shaft radial direction. The flange portion 38 protrudes toward outside in the radial direction with respect to the side cover 32. The flange portion 38 abuts on the butt end face 6c. The flange portion 38 covers the butt end face 6c of the shaft 6. The flange portion 38 covers an entirety of the butt end face 6c. The flange portion 38 is a continuous annular portion that is continuous in the shaft circumferential direction.

The center line of the weight member 10 coincides with the center line Z1 of the shaft 6, but it is not limited to such a configuration. The weight member 10 does not have to have a center line. From the viewpoint of the uniformity of the weight distribution in the shaft circumferential direction, the center line of the weight member 10 preferably coincides with the center line Z1 of the shaft 6.

In the weight member 10, the outer diameter of the side cover 32 is set so that the weight member 10 can be located inside the shaft 6. The outer diameter of the flange portion 38 is greater than the inner diameter of the butt end face 6c. The flange portion 38 abuts on the butt end face 6c. The flange portion 38 is engaged with the butt end face 6c. With this engagement, the positioning of the weight member 10 is achieved. In addition, this engagement allows the weight member 10 to be prevented from dropping to the inside of the shaft 6. As shown in FIG. 2, the flange portion 38 is interposed between the butt end face 6c and the end cap portion 8b. The flange portion 38 makes a contribution in surely fixing the weight member 10.

The weight member 10 may be fixed to the shaft 6, or alternatively, may be fixed to the grip 8, or further alternatively, may be fixed to between the shaft 6 and the grip 8. In the present embodiment, the weight member 10 is fixed to the shaft 6. Further, in the flange portion 38, the weight member 10 is interposed between the shaft 6 and the grip 8. Furthermore, an end face 39 of the weight member 10 on the grip butt end 8e side is in surface contact with the inner face 8g of the end cap portion 8b. These configurations make a contribution in surely fixing the weight member 10. In a case where the weight member 10 is fixed to the grip 8, for example, the weight member 10 may be embedded in the end cap portion 8b of the grip 8. As another example in the same case, a weight attachment part for the attachment of the weight member 10 may be provided on the butt end face 8c of the grip 8, and the weight member 10 may be attached to this weight attachment part.

A method for attaching the weight member 10 to the golf club 2 is as follows. First, the shaft 6 to which the grip 8 has not been attached is prepared. To the shaft 6, the golf club head 4 may be attached preliminarily. Next, on the butt end Bt side of the shaft 6, the weight member 10 is inserted. This insertion allows the side cover 32 of the weight member 10 to be located inside the shaft 6. At the same time, the flange portion 38 is engaged on the butt end face 6c of the shaft 6. Next, the shaft 6 incorporating the weight member 10 is inserted into the grip 8. Through these steps, the weight member 10 is attached to the golf club 2. The grip 8 is bonded to the outer surface 6a of the shaft 6, for example, with a double-sided adhesive tape.

The weight member 10 is surely fixed in the butt end region R1. Furthermore, of the weight member 10, contact surfaces with the shaft 6 are formed by the cover member 30, which suppresses the occurrence of strange sound. The weight member 10 which includes the cover member 30 and the weight body 20 located inside the cover member 30 absorbs vibration of the shaft 6, thereby improving feel at impact of the golf club 2.

A bidirectional arrow Da in FIG. 2 indicates a length of the weight member 10 in the axial direction. With a view to concentrating weight on the butt end Bt side, the length Da is preferably less than or equal to 50 mm, more preferably less than or equal to 45 mm, and further preferably less than or equal to 40 mm. With a view to increasing the weight of the weight member 10, the length Da is preferably greater than or equal to 5 mm, more preferably greater than or equal to 10 mm, and further preferably greater than or equal to 15 mm.

A bidirectional arrow Db in FIG. 2 indicates a distance between the tip end Tp side end of the weight member 10 and the butt end 8e of the grip 8. The distance Db is measured along the axial direction. With a view to concentrating weight on the butt end Bt side, the distance Db is preferably less than or equal to 70 mm, more preferably less than or equal to 60 mm, further preferably less than or equal to 50 mm, and still further preferably less than or equal to 40 mm. With a view to increasing the weight of the weight member 10, the distance Db is preferably greater than or equal to 15 mm, more preferably greater than or equal to 20 mm, and further preferably greater than or equal to 25 mm.

The cover member 30 in the present embodiment may have a JIS-A hardness of, preferably, greater than or equal to 50 degrees and less than or equal to 70 degrees. The hardness being set in the above-described range allows the flange portion 38 and the like to maintain a sufficient strength, while enhancing the vibration absorption effect achieved by the cover member 30, whereby the feel at impact of the golf club 2 can be improved. Note that the JIS-A hardness is measured by a Type A durometer under a temperature environment of 23° C. according to JIS-K6253.

In the present application, a grip-weight portion is defined. The golf club 2 includes a grip-weight portion 46. The "grip-weight portion 46" is a portion, of the golf club 2, that is constituted by the grip 8 and the weight member 10. In the grip-weight portion 46, the weight member 10 may be in contact with the grip 8, or alternatively, the weight member 10 does not have to be in contact with the grip 8. Even when the weight member 10 is not in contact with the grip 8, the combination of the grip 8 and the weight member 10 is defined as the grip-weight portion 46. It should be noted that the weight member 10 is positioned in the butt end region R1. The grip-weight portion 46 has a weight W2. The grip-weight portion 46 includes a bonding portion (a double-sided adhesive tape, etc.) that fixes the grip 8 to the shaft 6 and/or the like. When a bonding portion (an adhesive, etc.) that fixes the weight member 10 to the shaft 6 and/or the like is present, the grip-weight portion 46 includes this bonding portion. In the present embodiment, an adhesive or the like for fixing the weight member 10 is not used.

In the present application, a shaft-grip-weight portion is defined. The golf club 2 includes a shaft-grip-weight portion 48. The "shaft-grip-weight portion 48" is a portion, of the golf club 2, that is constituted by the shaft 6, the grip 8, and the weight member 10. In the shaft-grip-weight portion 48, the weight member 10 may be in contact with the grip 8, or alternatively, the weight member 10 does not have to be in contact with the grip 8. It should be noted that the weight member 10 is positioned in the butt end region R1. The shaft-grip-weight portion 48 has a weight W3. The shaft-grip-weight portion 48 includes a bonding portion (a double-sided adhesive tape, etc.) that fixes the grip 8 to the shaft 6 and/or the like. The shaft-grip-weight portion 48 includes a bonding portion (an adhesive, etc.) that fixes the weight member 10 to the shaft 6 and/or the like. The shaft-grip-weight portion 48 does not include a bonding portion (an adhesive, a sleeve, etc.) that fixes the head 4 to the shaft 6. The shaft-grip-weight portion 48 does not include a ferrule.

[1. Relationship Between Specifications of Golf Club and Swing]

The inventors of the present disclosure closely studied swing, based on new viewpoints. As a result, they have found that the specifications of a golf club could adversely affect swing. A conventional heavy golf club cannot increase the head speed, resulting in a short flight distance. From this viewpoint, a lightweight golf club whose parts other than the head have a reduced weight has been developed. This lightweight golf club contributes to increased head speed. The inventors of the present disclosure, however, have found that this conventional lightweight golf club could adversely affect swing.

[1-1. Off-Plane Swing Resulting from Specifications of Golf Club]

Figure 4:
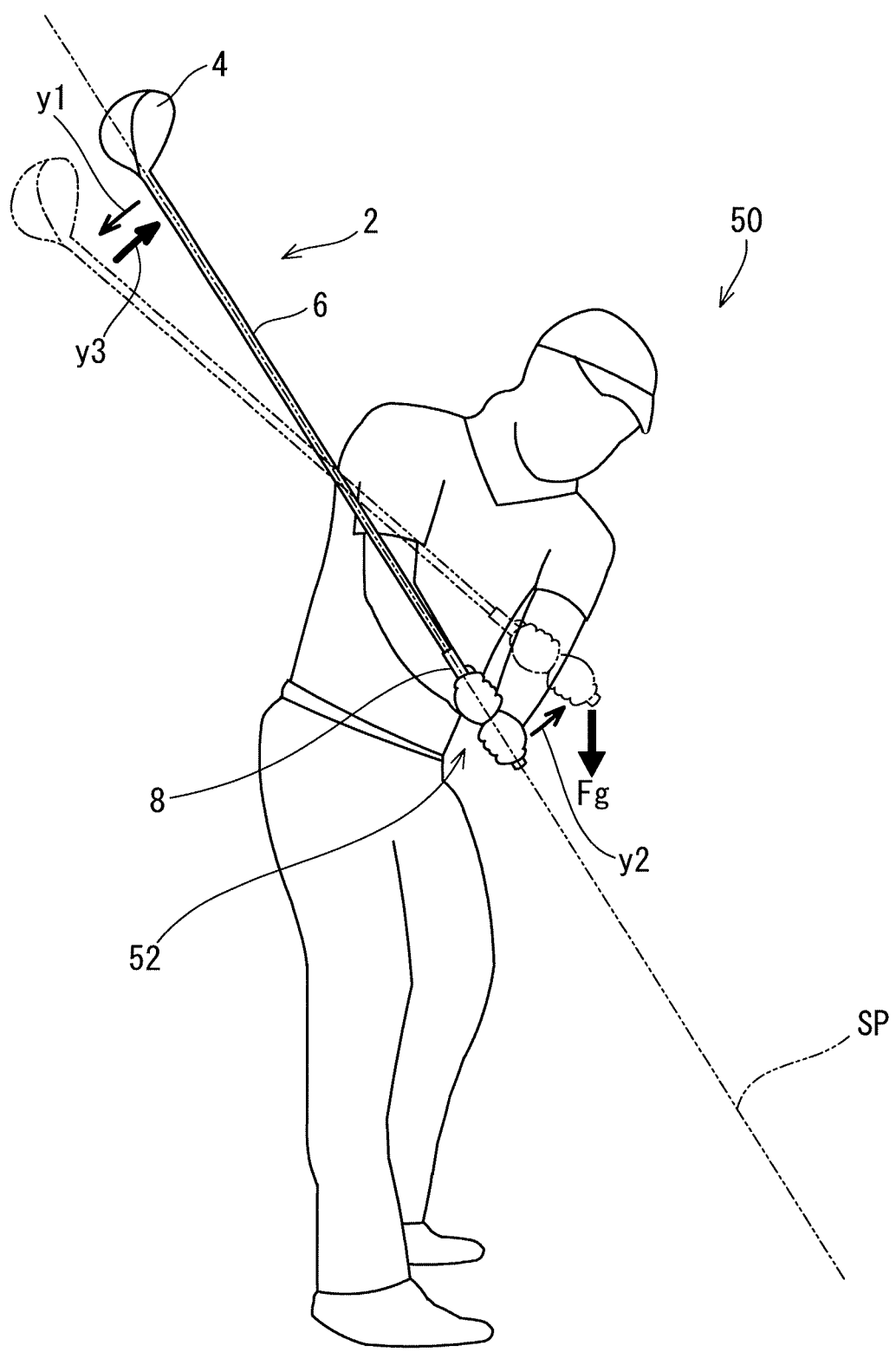
FIG. 4 shows a state of a golfer in a swinging motion, in the phase of a take-back (backswing) action, viewed from the rear side in the target direction.

FIG. 4 shows a state of a golfer 50 in a swinging motion, viewed from the rear side in the target direction. FIG. 4 shows a phase in the middle of a backswing. The golfer 50 in a swinging motion holds the grip 8 of the golf club 2 with hands 52. The hands 52 include the right hand and the left hand. The hands 52 mean the finger-side portions with respect to the wrists. In a take-back action (backswing) and a downswing, the golf club 2 is in an obliquely inclined state, with the grip 8 side being the lower side.

In FIG. 4, a swing plane SP is indicated with a two-dot chain line. Ideal swing planes SP can be found for respective golfers 50. It is known that a swing in which the golf club 2 and the hands 52 move on the swing plane SP stabilizes the path of swing, which is likely to lead to a good shot. FIG. 4 shows an excellent swing in which the golf club 2 and the hands 52 move on the swing plane SP. This excellent swing is also referred to as an "on-plane swing".

The force of gravity acting on the head 4 acts downward in the vertical direction. This force of gravity rotates the golf club 2 around the hands 52 as the fulcrum, acting such that the golf club 2 tends to lie down. As a result, the head side of the golf club 2 tends to go out downward with respect to the swing plane SP (see the arrow y1 and the two-dot chain lines in FIG. 4).

The golf club 2, starting to rotate, has a natural tendency to rotate around the center of gravity of the golf club 2 as the fulcrum. Therefore, when the head side of the golf club 2 goes downward in the rotation, the grip side of the golf club 2 is pushed upward. In other words, the hands 52 are pushed upward. As a result, the hands 52 tend to go out upward with respect to the swing plane SP (see the arrow y2 and the two-dot chain lines in FIG. 4). The position of the hands 52 directly affects swing.

It has been found that, in this way, the force of gravity acting on the head 4 causes the golf club 2 and the hands 52 to go out of the swing plane SP. This phenomenon has been clarified by accurately measuring the motions of golfers and golf clubs in many swing actions. This phenomenon increases the degree of deviation in positions of the golf club 2 and the hands 52 from the swing plane SP. In other words, this phenomenon causes a swing with the golf club 2 and the hands 52 being off the swing plane (hereinafter referred to as an off-plane swing). In this swing, the path of swing and the hitting point tend to vary in each shot.

From the viewpoint of ease-of-swing, a lightweight club having a weight-reduced shaft and grip has been developed. However, since a weight reduction in the head causes a deterioration in rebound performance, the reduction of the head weight is limited. As a result, even when the club is lightweight, its head has a heavy weight. As described above, it has been found that such a club tends to cause the above-defined off-plane swing.

It was considered that the ease-of-swing and the increase of the head speed necessarily require reducing the weight of the club. As a result, both of the weight of the shaft and the weight of the grip (a grip-located portion) were reduced. An idea of making the grip-located portion heavy while reducing the weight of the shaft ran counter to conventional technical knowledges, and was impossible to adopt.

[1-2. On-Plane Effect]

In the present embodiment, the weight of a grip-located portion is increased, while the weight of the shaft is reduced. Particularly, the weight of the butt end region R1, which is a part closer to the butt end Bt in the grip-located portion, is increased.

Figure 5:
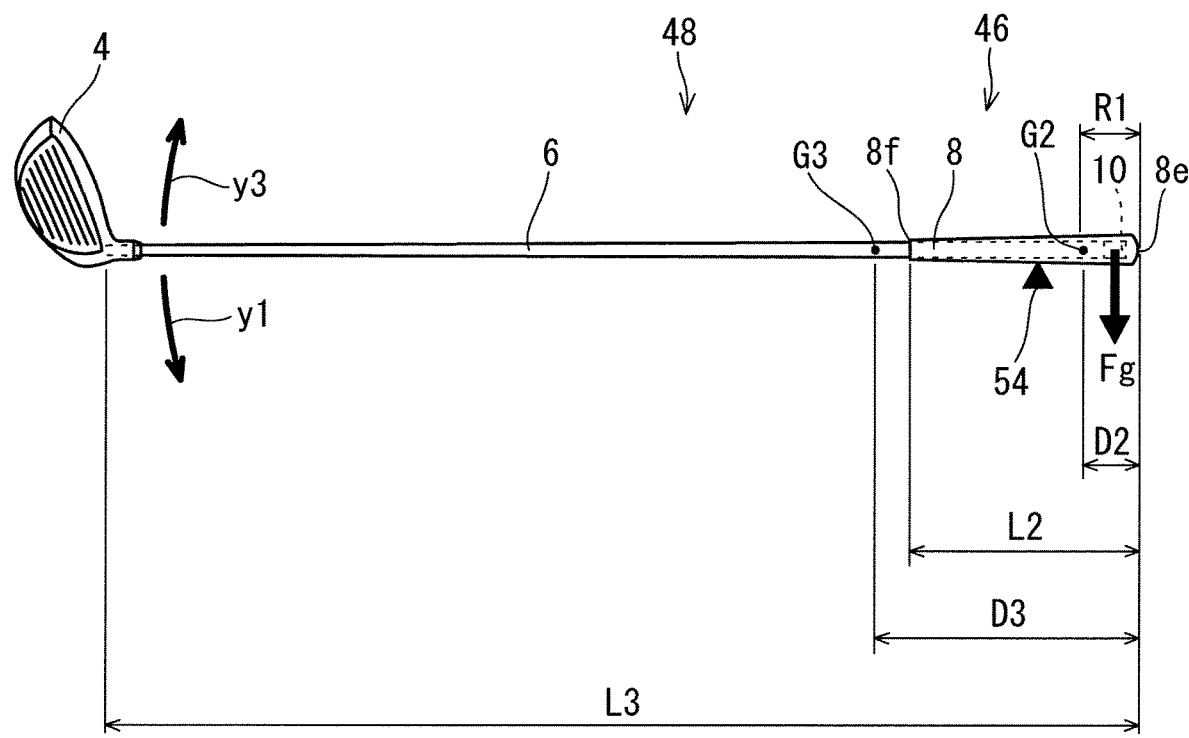
FIG. 5 is a conceptual diagram for explaining an effect of a weight of a butt end region.

FIG. 5 shows the same golf club 2 as in FIG. 1. As described above, in a swinging motion, the golf club 2 has a natural tendency to rotate around the hands 52 as a fulcrum 54, such that the head side portion of the golf club 2 goes downward (see the arrow y1 in FIG. 5). The position of the fulcrum 54 is approximately the center in the axial direction of the hands 52 holding the grip 8. The moment of this rotation is also referred to as "off-plane moment". In contrast, in the present embodiment, the weight of the shaft 6 is reduced, the weight of the butt end region R1 is increased, and a force of gravity Fg acts on the butt end region R1. The force of gravity Fg acting on the butt end region R1 generates a rotation moment about the hands 52 as the fulcrum 54, the rotation moment being going to raise the head side portion of the golf club 2 with respect to the grip side portion thereof (see the arrow y3 in FIG. 5). This rotation moment, which acts in the reverse direction against the off-plane moment, is also referred to as "anti-off-plane moment".

The anti-off-plane moment prevents the head side portion of the golf club 2 from going down and from going out of the swing plane SP. At the same time, the hands 52 are also prevented from going up and from going out of the swing plane SP. The combination of the lightweight shaft 6 and the heavy butt end region R1 makes a contribution in causing the golf club 2 and the hands 52 to go closer to the swing plane SP. This advantageous effect is also referred to as the on-plane effect. The on-plane effect decreases the number of missed shots, stabilizes the path of swing, and makes hitting points consistent. As a result, an average flight distance increases, and the hitting point is prevented from varying in each shot.

The golf club 2 has a long length. A long golf club is apt to have a large variation in hitting points. With the golf club 2, however, the on-plane effect suppresses the variation in hitting points. As a result, consistent hitting points are obtained even when the club is long, and an increased head speed resulting from the greater club length can also be attained. The average flight distance consequently increases further.

[1-3. Square Impact Effect]

Figure 6:
FIG. 6 shows a state of a golfer in a swinging motion, at the top of swing, viewed from the rear side in the target direction.

FIG. 6 shows a state of the golfer 50 in a swinging motion, viewed from the rear side in the target direction. FIG. 6 shows a phase at the top-of-swing (top).

As described above, in a case where the off-plane moment causes a club to rotate and causes its head 4 to go downward, the head 4 rotates so that its face 4a is oriented upward in the vicinity of the top (see the two-dot chain line arrow in FIG. 6). Therefore, to make the face 4a square at impact, a greater angle of the head rotation is required. Thus, it is difficult to make the face 4a square at impact, and this club is apt to have an impact with the face 4a being open. In contrast, in the golf club 2, the anti-off-plane moment makes it difficult for its head 4 to go downward. Therefore, its face 4a is unlikely to be oriented upward at the top-of-swing. As a result, it is easier to correct the face 4a to a state of being square at impact, which achieves an excellent catchability. This advantageous effect is referred to as "square impact effect".

It should be noted that "catchability" means such a property that the face 4a is unlikely to be open at impact. A club having an excellent catchability is unlikely to make an impact with an open face, thereby being unlikely to hit a slice. A club having an excellent catchability is able to make a solid impact to hit a ball with the face 4a. Therefore, the kinetic energy of the head is easily transmitted to the ball, whereby flight-distance loss is reduced. The "square impact (being square at impact)" means that the normal line of the face 4a at impact is directed in the target direction. In the square impact, the face 4a is neither open nor closed.

[1-4. Swing MI Reduction Effect]

In a swinging motion, the wrists are cocked. "Cock (wrist cock)" means the bending of wrists in a swinging motion. The wrists become easier to cock by distributing an increased weight to the butt end side with respect to the hand-holding position on the grip that serves as a fulcrum of the wrist cock. The wrist cock decreases the distance between the club and the center of swing rotation in a swinging motion, thereby making the swing MI smaller. The "swing MI" means an effective moment of inertia of the golf club 2 about the center of swing. The decrease in the swing MI makes the golf club 2 easy to swing, thereby increasing the head speed, in spite of the heaviness of the butt end region R1. This advantageous effect is also referred to as the swing MI reduction effect.

The golf club 2 includes the head 4 having a heavy weight. On the other hand, the golf club 2 has a light weight. In a case where the head 4 is heavy whereas the club is lightweight, this golf club is usually difficult to swing. However, as described above, in the golf club 2, the swing MI is decreased by reducing the weight of the shaft 6 and increasing the weight of the butt end region R1. This makes the golf club 2 easy to swing.

The swing MI reduction effect makes the club easy to swing in spite of the heaviness of the head 4, thereby increasing the swing speed, and increasing the head speed as well. As a result, the energy given to a ball by the club hitting the ball increases, thereby increasing the initial velocity of the ball, and increasing the flight distance.

[2. Specifications of Golf Club]

Specifications of the golf club 2 that are able to further improve the above-described advantageous effects are as follows.

[2-1. Head Gravity Center Distance H1]

A distance between a center of gravity Gh of the head 4 and the center line Z1 of the shaft 6 is defined as the head gravity center distance H1 (see FIG. 10 described below). The head gravity center distance H1 is a three-dimensional distance between the center of gravity Gh and the center line Z1, which corresponds to a so-called distance between a point and line in a three-dimensional space. In other words, the head gravity center distance H1 is a three-dimensional length of a perpendicular line drawn from the center of gravity Gh to the center line Z1. Note that the center line Z1 coincides with the center line of a hosel hole.

When the head weight Wh is heavy and the head gravity center distance H1 is long, a moment of inertia of the head about the shaft axis line Z1 (shaft center line Z1) is increased. In this case, a rotation of the head 4 about the shaft axis line Z1 is suppressed, thereby suppressing variation in the orientation of the face 4a at impact. As a result, variation in directivity of hit balls is decreased, and thus the directional stability of hit balls is enhanced. On the other hand, in this case, since the rotation of the head 4 about the shaft axis line Z1 is suppressed, the face 4a becomes difficult to rotate. For this reason, it becomes difficult to correct the face 4a to the state of being square at impact, which is likely to lead to an impact with the face 4a being open.

In the golf club 2, however, the square impact effect achieved by the anti-off-plane moment makes it easy to bring the face 4a into the state of being square impact. Thus, even when the head gravity center distance H1 is great, an excellent ball catchability is attained.

With a view to enjoying the directional stability of hit balls in addition to ensuring the excellent catchability by taking advantage of the square impact effect, the head gravity center distance H1 is preferably greater than or equal to 43.5 mm, more preferably greater than or equal to 44.0 mm, and further preferably greater than or equal to 44.5 mm. Considering the restriction on the head volume defined by the golf rules, the head gravity center distance H1 is preferably less than or equal to 50.0 mm, more preferably less than or equal to 49.5 mm, and further preferably less than or equal to 49.0 mm. The head gravity center distance H1 which is set to greater than or equal to 44.5 mm allows the head to have a large size and a high degree of freedom in design.

[2-2. Club Weight Wc]

Many of amateur golfers are not able to complete their swing to reach a proper finish position with a too heavy club. Lightweight clubs are preferable particularly for relatively powerless golfers (also referred to as "golfers in Category A") to which the largest number of golfers belong when all golfers are classified. The golfers in Category A are golfers who swing a driver at a head speed of 33.0 m/s to 42.0 m/s and have a handicap of greater than or equal to 18 and less than or equal to 36.

From the viewpoint of ease-of-swing for the golfers in Category A, the club weight Wc is preferably less than or equal to 300 g, more preferably less than or equal to 295 g, further preferably less than 295 g, and still further preferably less than or equal to 290 g. Considering the weight W1 of the butt end region R1 and the head weight Wh, the club weight Wc is preferably greater than or equal to 275 g, more preferably greater than or equal to 277 g, and further preferably greater than or equal to 279 g.

[2-3. Head Weight Wh]

With a view to increasing the kinetic energy of the head 4 and increasing the initial velocity of a ball, the head weight Wh is preferably greater than or equal to 192 g, more preferably greater than or equal to 195 g, and further preferably greater than or equal to 196 g. Considering the club weight Wc, the head weight Wh is preferably less than or equal to 210 g, more preferably less than or equal to 205 g, and further preferably less than or equal to 200 g.

[2-4. Lateral Moment of Inertia Ih of Head]

The head 4 has a lateral moment of inertia Ih that is a moment of inertia about a vertical line passing through the center of gravity Gh of the head 4. The unit of the moment of inertia Ih is ($g \cdot cm^2$). The moment of inertia Ih can be measured by using, for example, MODEL NUMBER RK/005-002 manufactured by INERTIA DYNAMICS.

A greater lateral moment of inertia Ih suppresses rotation of the head 4 in a shot in which the hitting point is off the sweet spot, thereby enhancing the directional stability of hit balls and also increasing the average flight distance. In this case, however, the rotation of the head 4 is suppressed, whereby the face 4a becomes rather difficult to correct to the state of being square at impact. In the golf club 2, however, the square impact effect achieved by the anti-off-plane moment makes it easy to bring the face 4a into the state of being square impact. Thus, even when the lateral moment of inertia Ih is great, an excellent ball catchability is attained.

With a view to enjoying the benefits of the greater lateral moment of inertia Ih in addition to ensuring the excellent catchability by taking advantage of the square impact effect, the lateral moment of inertia Ih of the head is preferably greater than or equal to 4500 ($g \cdot cm^2$), more preferably greater than or equal to 4550 ($g \cdot cm^2$), and further preferably greater than or equal to 4600 ($g \cdot cm^2$). Considering the restriction on the head volume defined by the golf rules, the lateral moment of inertia Ih is preferably less than or equal to 5500 ($g \cdot cm^2$), more preferably less than or equal to 5400 ($g \cdot cm^2$), and further preferably less than or equal to 5300 ($g \cdot cm^2$).

[2-5. Weight W1 in Butt End Region R1]

As described above, the butt end region R1 is a region having a distance from a butt end of the golf club 2 in the axial direction of less than or equal to 100 mm. The weight W1 of the butt end region R1 is a weight of the golf club 2 in the butt end region R1. The weight W1 includes the weight of the grip 8 in the region R1, the weight of the weight member 10 in the region R1, and the weight of the shaft 6 in the region R1. Further, when an adhesive, a double-sided adhesive tape, and/or the like is present in the butt end region R1, the weight of those is also included in the weight W1.

With a view to enhancing the on-plane effect, the weight W1 of the butt end region R1 is preferably greater than or equal to 30 g, more preferably greater than or equal to 31 g, further preferably greater than or equal to 32 g, still further preferably greater than or equal to 33 g, and still further preferably greater than or equal to 34 g. Considering the club weight Wc, the weight W1 of the butt end region R1 is preferably less than or equal to 70 g, more preferably less than or equal to 60 g, further preferably less than or equal to 50 g, and still further preferably less than or equal to 45 g.

[2-6. Weight W2 of Grip-Weight Portion]

With a view to enhancing the on-plane effect, the weight W2 of the grip-weight portion is preferably greater than or equal to 40 g, more preferably greater than or equal to 41 g, and further preferably greater than or equal to 42 g. Considering the club weight Wc, the weight W2 of the grip-weight portion is preferably less than or equal to 75 g, more preferably less than or equal to 65 g, further preferably less than or equal to 55 g, and still further preferably less than or equal to 50 g.

[2-7. Weight W3 of Shaft-Grip-Weight Portion]

With a view to making the weight of the shaft 6 lightweight and making the grip-weight portion 46 heavier, the weight W3 of the shaft-grip-weight portion is preferably set in a predetermined range. The lower limit value of the range of the weight W3 is preferably greater than or equal to 75 g, more preferably greater than or equal to 78 g, and further preferably greater than or equal to 80 g. The upper limit value of the range of the weight W3 is preferably less than or equal to 100 g, more preferably less than or equal to 90 g, and further preferably less than or equal to 88 g.

[2-8. W1/W3]

"W1/W3" is a ratio of the weight W1 of the butt end region R1 to the weight W3 of the shaft-grip-weight portion. W1/W3 can be increased by concentrating weight in the butt end region R1. An increase in W1/W3 increases the anti-off-plane moment, thereby enhancing the on-plane effect. From this viewpoint, W1/W3 is preferably greater than or equal to 0.40, more preferably greater than or equal to 0.41, and further preferably greater than or equal to 0.42. Considering the limit of the weight W1 of the butt end region R1, W1/W3 is preferably less than or equal to 0.60, more preferably less than or equal to 0.58, and further preferably less than or equal to 0.56.

[2-9. Gravity Center Ratio T3 of Shaft-Grip-Weight Portion]

The shaft-grip-weight portion 48 has a center of gravity G3. The bidirectional arrow D3 shown in FIG. 5 indicates a distance from the butt end 8e of the grip 8 to the center of gravity G3. The distance D3 is measured along the axial direction. The bidirectional arrow L3 shown in FIG. 5 indicates a distance from the butt end 8e of the grip 8 to the tip end Tp of the shaft 6. The distance L3 is measured along the axial direction.

The gravity center ratio T3 (%) of the shaft-grip-weight portion 48 is calculated by (D3/L3)×100. By making the shaft 6 lighter in weight and increasing the weight W1 of the butt end region R1, the center of gravity G3 is positioned closer to the butt end Bt, whereby the gravity center ratio T3 can be decreased. With a view to enhancing the on-plane effect, the gravity center ratio T3 is preferably less than or equal to 30%, more preferably less than or equal to 29%, further preferably less than or equal to 28%, and still further preferably less than or equal to 27%. Considering the limit of the weight W1 of the butt end region R1, the gravity center ratio T3 is preferably greater than or equal to 20%, more preferably greater than or equal to 22%, and further preferably greater than or equal to 24%.

[2-10. Gravity Center Ratio T2 of Grip-Weight Portion]

The grip-weight portion 46 has a center of gravity G2. The bidirectional arrow D2 shown in FIG. 5 indicates a distance from the butt end 8e of the grip 8 to the center of gravity G2. The distance D2 is measured along the axial direction. The bidirectional arrow L2 shown in FIG. 5 indicates a distance from the butt end 8e of the grip 8 to the tip end 8f of the grip 8. In other words, L2 indicates a length of the grip 8. The distance L2 is measured along the axial direction. The center of gravity G2 is positioned in the butt end region R1.

The gravity center ratio T2 (%) of the grip-weight portion 46 is calculated by (D2/L2)×100. By making the grip 8 lighter in weight and increasing the weight W1 of the butt end region R1, the center of gravity G2 is positioned closer to the butt end Bt, whereby the gravity center ratio T2 can be decreased. With a view to enhancing the on-plane effect, the gravity center ratio T2 is preferably less than or equal to 30%, more preferably less than or equal to 29%, and further preferably less than or equal to 28%. Considering the limit of the weight W1 of the butt end region R1, the gravity center ratio T2 is preferably greater than or equal to 5%, more preferably greater than or equal to 10%, and further preferably greater than or equal to 15%.

[2-11. Ws/Wc]

"Ws/Wc" is a ratio of the shaft weight Ws to the club weight Wc. By decreasing this ratio, weight can be effectively concentrated in the butt end region R1, while the swing MI is decreased. From this viewpoint, Ws/Wc is preferably less than or equal to 0.15, and more preferably less than or equal to 0.145. An excessively great club weight Wc makes the club difficult to swing, which decreases the head speed. From this viewpoint, Ws/Wc is preferably greater than or equal to 0.11, more preferably greater than or equal to 0.12, and further preferably greater than or equal to 0.13.

[2-12. Wg/W2]

"Wg/W2" is a ratio of the grip weight Wg to the weight W2 of the grip-weight portion. By decreasing this ratio, weight can be effectively concentrated in the butt end region R1. With a view to enhancing the on-plane effect, Wg/W2 is preferably less than or equal to 0.80, more preferably less than or equal to 0.78, further preferably less than or equal to 0.76, and still further preferably less than or equal to 0.74. Wg/W2 is preferably greater than or equal to 0.50, more preferably greater than or equal to 0.55, and further preferably greater than or equal to 0.60.

[2-13. W1/Ws]

"W1/Ws" is a ratio of the weight W1 of the butt end region R1 to the shaft weight Ws. With a view to increasing the anti-off-plane moment so as to enhance the on-plane effect, W1/Ws is preferably greater than or equal to 0.75, more preferably greater than or equal to 0.80, and further preferably greater than or equal to 0.85. Considering the preferable ranges of W1 and Ws, W1/Ws is preferably less than or equal to 1.20, more preferably less than or equal to 1.10, and further preferably less than or equal to 1.00.

[2-14. Club Length Lc]

With a view to increasing the radius of the path of the head 4 so as to increase the head speed, the club length Lc is preferably greater than or equal to 45.0 inches, more preferably greater than or equal to 45.5 inches, and further preferably greater than or equal to 45.75 inches. A longer club length Lc could increase the off-plane moment. In the golf club 2, however, the anti-off-plane moment makes it possible to attain the on-plane effect even when the club length Lc is increased. Although a longer club length Lc generally tends to cause variation in hitting points, this on-plane effect prevents the variation in hitting points. Further, the above-described swing MI reduction effect allows the ease-of-swing to be ensured, even with a longer club length Lc. Considering the golf rules and the ease-of-swing, the club length Lc is preferably less than or equal to 48 inches, more preferably less than or equal to 47 inches, and further preferably less than or equal to 46 inches.

[2-15. Shaft Weight Ws]

Reduction of the shaft weight Ws makes it possible to effectively concentrate weight in the butt end region R1 while decreasing the swing MI. From this viewpoint, the shaft weight Ws is preferably less than or equal to 42 g, more preferably less than or equal to 41 g, and further preferably less than or equal to 40 g. From the viewpoint of the strength of the shaft, the shaft weight Ws is preferably greater than or equal to 25 g, more preferably greater than or equal to 30 g, and further preferably greater than or equal to 35 g.

[2-16. Grip Weight Wg]

By decreasing the grip weight Wg, weight can be effectively concentrated in the butt end region R1, where the weight member 10 is located. From this viewpoint, the grip weight Wg is preferably less than or equal to 35 g, more preferably less than or equal to 33 g, and further preferably less than or equal to 31 g. From the viewpoint of the strength of the grip, the grip weight Wg is preferably greater than or equal to 20 g, more preferably greater than or equal to 22 g, and further preferably greater than or equal to 24 g.

[2-17. Shaft Length Ls]

Considering the preferable range of the club length Lc, the shaft length Ls is preferably greater than or equal to 44 inches, more preferably greater than or equal to 44.5 inches, and further preferably greater than or equal to 45 inches. Considering the preferable range of the club length Lc, the shaft length Ls is preferably less than or equal to 47.5 inches, more preferably less than or equal to 47 inches, and further preferably less than or equal to 46 inches.

[2-18. Moment of Inertia Ic]

Ic represents a moment of inertia of a club about the center of gravity of the club. The unit of the moment of inertia Ic is g·cm². The moment of inertia Ic can be measured by using, for example, MODEL NUMBER RK/005-002 manufactured by INERTIA DYNAMICS.

When the golf club 2 has a greater moment of inertia Ic about its center of gravity, the behavior of the golf club 2 is stabilized and a swaying motion of the golf club 2 is suppressed. As a result, variation in hitting points is lessened. With a view to stabilizing the behavior of the golf club 2 and suppressing the swaying motion of the golf club 2, the moment of inertia Ic is preferably greater than or equal to $500 \times 10^3$ (g·cm²), more preferably greater than or equal to $520 \times 10^3$ (g·cm²), and further preferably greater than or equal to $540 \times 10^3$ (g·cm²). Considering the restriction in design of the club, the moment of inertia Ic is preferably less than or equal to $650 \times 10^3$ (g·cm²), more preferably less than or equal to $630 \times 10^3$ (g·cm²), and further preferably less than or equal to $610 \times 10^3$ (g·cm²).

[2-19. Swing Moment of Inertia Isw (Swing MI)]

The swing moment of inertia means a moment of inertia of the golf club 2 about a swing axis. The swing moment of inertia Isw is calculated by the following formula (1). The formula (1) is based on the parallel axis theorem.

$$Isw = Wc \times (Lg+40)^2 + Ic \quad (1),$$

where Wc represents the club weight (g), Lg represents a distance (cm) in the axial direction between the butt end 8e of the grip 8 and the center of gravity of the club, and Ic represents a moment of inertia (g·cm²) about the center of gravity of the club. The unit of the swing moment of inertia Isw is (g·cm²).

Figure 7:
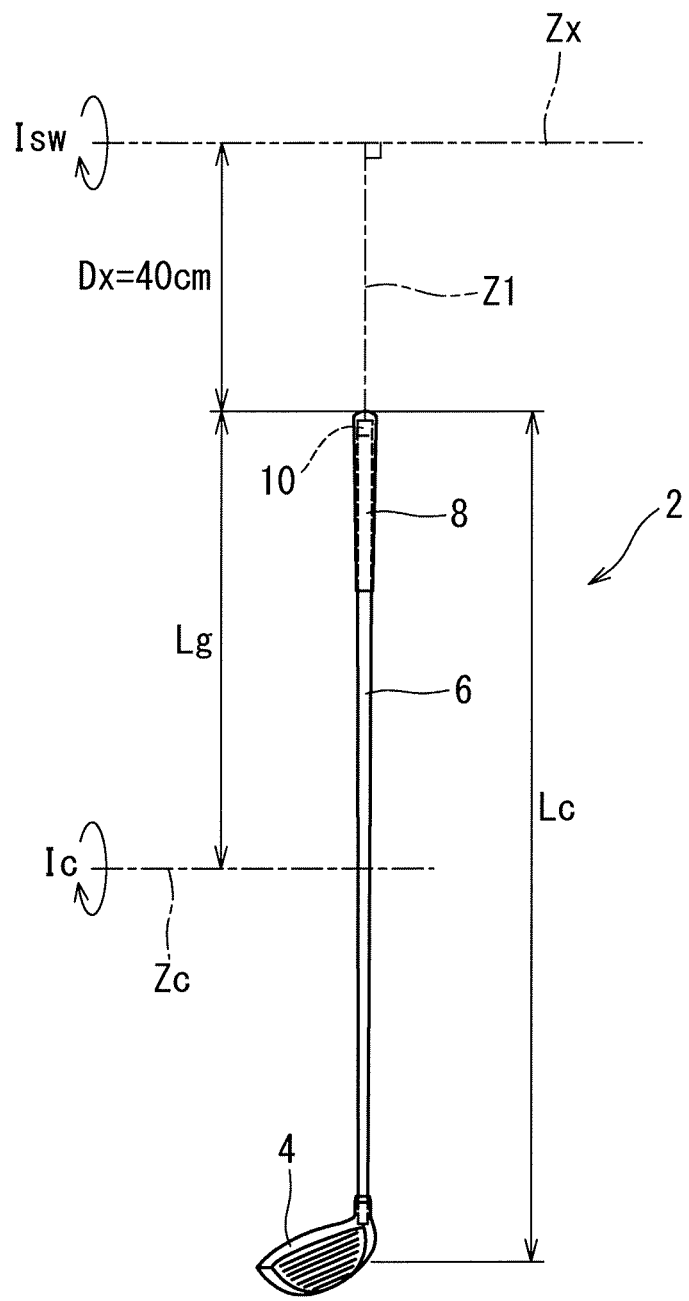
FIG. 7 is a conceptual diagram for explaining a swing moment of inertia Isw.

FIG. 7 is a conceptual diagram for explaining the swing moment of inertia Isw. In an actual swinging motion, the golf club rotates together with the golfer's arms about the golfer's body as the rotation axis. In the calculation of the swing moment of inertia Isw, a swing axis Zx is set while taking the position of the golfer's body into consideration. The swing axis Zx is away from the butt end 8e of the grip 8. Considering an actual swinging motion, an interval distance Dx between the swing axis Zx and the butt end 8e of the grip 8 is set to 40 cm (see FIG. 7). The swing moment of inertia Isw is an index in which actual conditions of swing are reflected.

An axis Zc shown in FIG. 7 is a straight line that passes through the center of gravity of the club. This axis Zc is parallel to the swing axis Zx. The moment of inertia Ic is a moment of inertia of the club 2 about the axis Zc. The swing axis Zx is perpendicular to the shaft axis line Z1. The axis Zc is perpendicular to the shaft axis line Z1.

Figure 8:
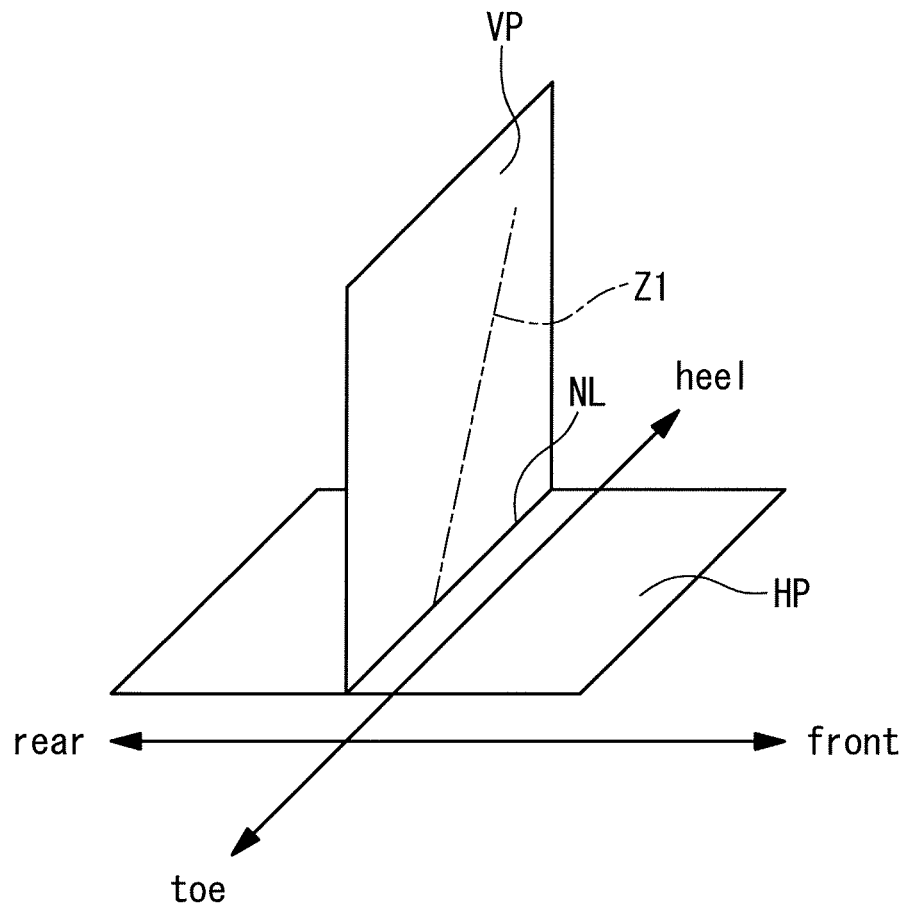
FIG. 8 is a conceptual diagram for explaining a reference state.

In the present application, a "reference state" is defined. The reference state is a state where a sole of the club 2 is placed at a specified lie angle and real loft angle on a horizontal plane. As shown in FIG. 8, in the reference state, the shaft axis line Z1 (shaft center line Z1) is included in a plane VP that is perpendicular to the horizontal plane. The plane VP is defined as a reference perpendicular plane. The specified lie angle and real loft angle are described in, for example, a product catalog.

As is clear from FIG. 7, the moment of inertia Ic is measured in a state where the face surface is made substantially square with respect to the head path. This orientation of the face is an ideal state at impact. The moment of inertia Ic is measured in a state where the axis Zc is included in the reference perpendicular plane VP. Therefore, in the calculated swing moment of inertia Isw, the swing axis Zx is included in the reference perpendicular plane VP. The swing moment of inertia Isw is calculated while taking the posture of the club in the vicinity of the impact into consideration.

With a view to further enhancing the above-described swing MI reduction effect, the moment of inertia Isw is preferably less than or equal to $5450 \times 10^3$ (g·cm²), more preferably less than or equal to $5440 \times 10^3$ (g·cm²), and further preferably less than or equal to $5430 \times 10^3$ (g·cm²). Considering the head weight Wh, the moment of inertia Isw is preferably greater than or equal to $5200 \times 10^3$ (g·cm²), more preferably greater than or equal to $5250 \times 10^3$ (g·cm²), and further preferably greater than or equal to $5300 \times 10^3$ (g·cm²).

[2-20. Golf Club Number]

The longer a club is, the more importance golfers tend to place on its flight distance performance. Furthermore, the longer a club is, the more significantly the hitting point thereof varies in each shot, resulting in that the direction of a hit ball is hardly stabilized. Negative properties of a long club are improved effectively by the above-described effects. From this viewpoint, a wood-type club is preferable, and a driver is particularly preferable. The driver has a real loft angle of, usually, greater than or equal to 7° and less than or equal to 15°. The head has a volume of preferably greater than or equal to 350 cc, more preferably greater than or equal to 380 cc, further preferably greater than or equal to 400 cc, and still further preferably greater than or equal to 420 cc. From the viewpoint of the head strength, the head preferably has a volume of less than or equal to 470 cc.

[3. Measuring Method]

Methods for measuring the specifications are as follows.

[3-1. Club Length Lc]

The club length Lc in the present application is measured in accordance with the regulation announced by the R&A (the Royal and Ancient Golf Club of Saint Andrews). This regulation is described in "1c. Length" in "1. Clubs" of "Appendix II—Design of Clubs" in the latest Rules of Golf issued by R&A. The measurement method is performed when the club is placed on a horizontal plane and the sole thereof is set against a plane having an angle of 60 degrees with respect to the horizontal plane. This method is therefore also referred to as the "60-degree measurement method".

[3-2. Moment of Inertia Ic]

As described above, the moment of inertia Ic is the moment of inertia of the golf club 2 about the center of gravity of the golf club 2. The moment of inertia Ic is the moment of inertia of the golf club 2 about an axis line that passes through the center of gravity of the golf club 2 and is perpendicular to the shaft center line Z1.

Figure 9:
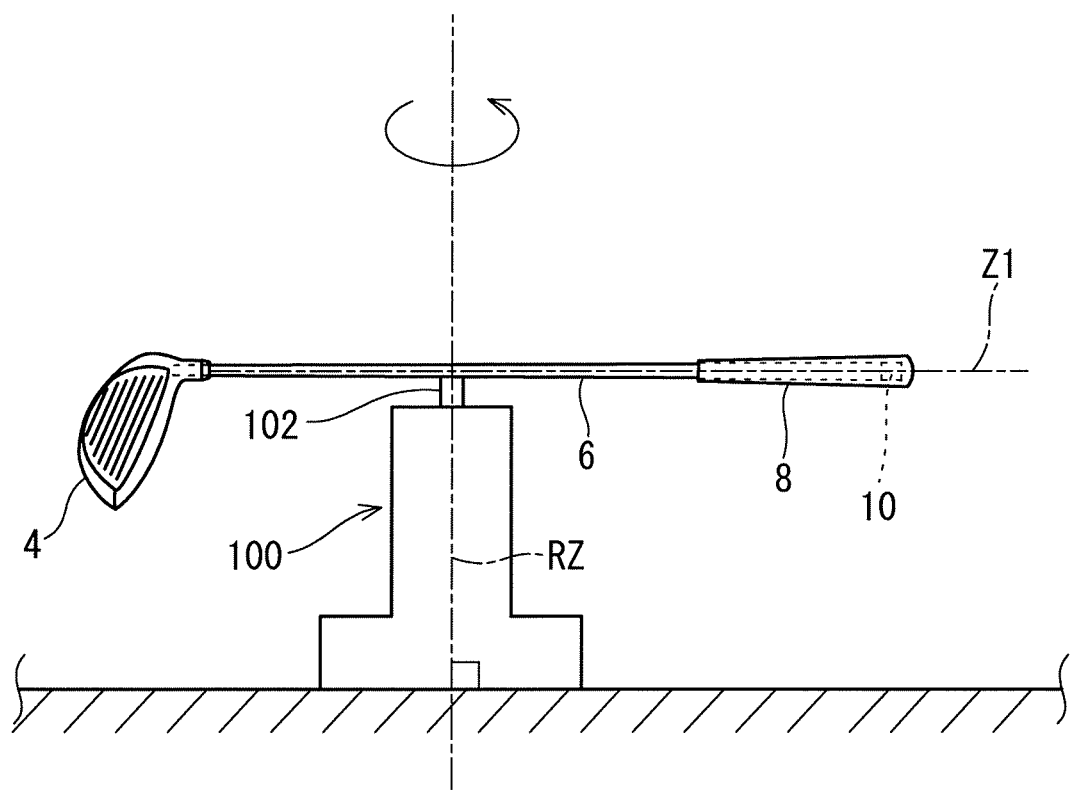
FIG. 9 is a schematic diagram illustrating a method for measuring a moment of inertia of a golf club about a center of gravity of the club.

FIG. 9 shows a method for measuring the moment of inertia Ic. As shown in FIG. 9, the golf club 2 is placed on a measuring jig 102 of a moment-of-inertia measuring instrument 100 such that the shaft center line Z1 is set in the horizontal direction. As the moment-of-inertia measuring instrument 100, MODEL NUMBER RK/005-002 manufactured by INERTIA DYNAMICS is used. The golf club 2 is placed on the measuring jig 102 so that the center of gravity of the golf club 2 is positioned on a rotation axis RZ. Thus, the moment of inertia Ic is measured.

[3-3. Lateral Moment of Inertia Ih of Head]

As described above, the lateral moment of inertia Ih of the head 4 is a moment of inertia about a vertical line passing through the center of gravity Gh of the head 4. In the above-described reference state, a line that passes through the center of gravity Gh of the head 4 and is perpendicular to the horizontal plane HP is a rotation axis RZ. The lateral moment of inertia Ih is the moment of inertia about the rotation axis RZ.

Figure 10:
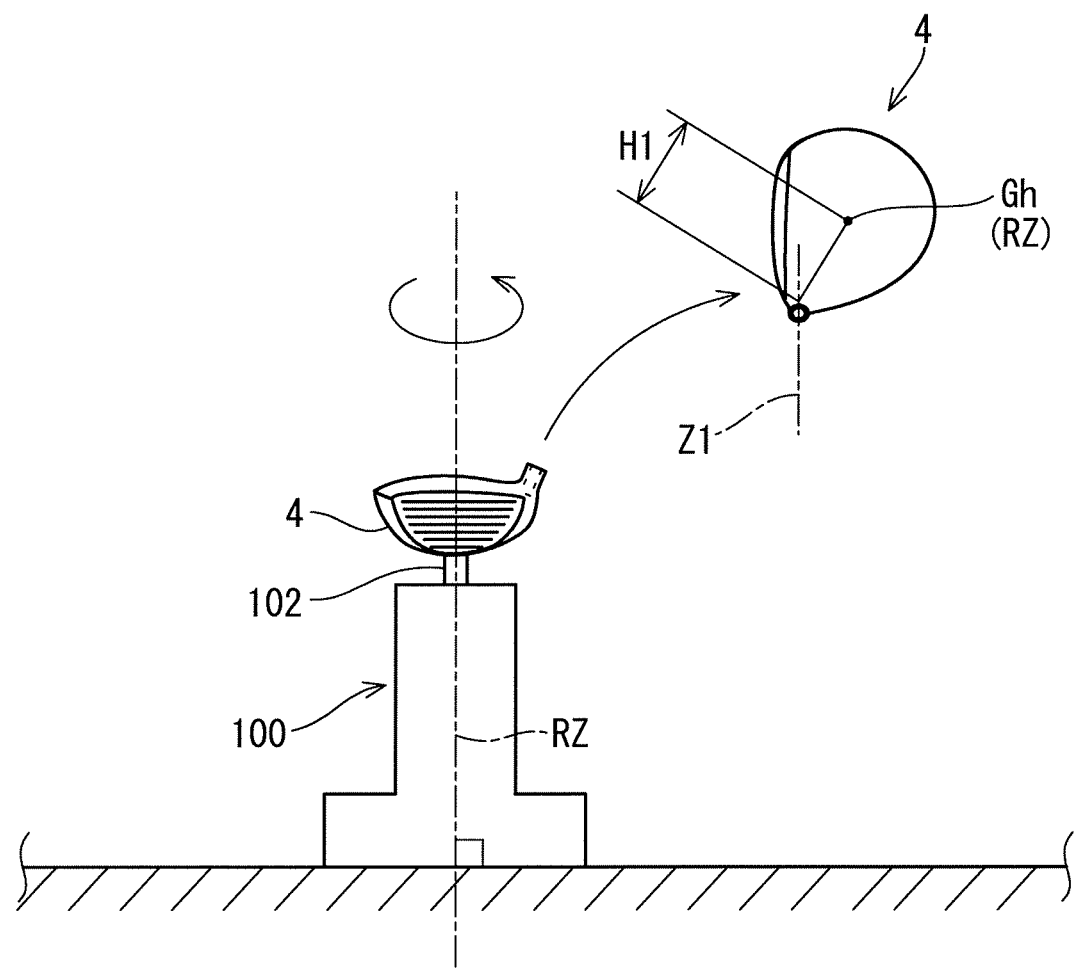
FIG. 10 is a schematic diagram illustrating a method for measuring a lateral moment of inertia Ih of a head.

FIG. 10 shows a method for measuring the lateral moment of inertia Ih. As shown in FIG. 10, the head 4 is placed on a measuring jig 102 of a moment-of-inertia measuring instrument 100 such that the rotation axis RZ is set to a state described above. As the moment-of-inertia measuring instrument 100, MODEL NUMBER RK/005-002 manufactured by INERTIA DYNAMICS is used. Thus, the lateral moment of inertia Ih is measured. Note that FIG. 10 also shows a drawing of the head 4 to be measured as viewed from above.

EXAMPLES

Hereinafter, effects of the present disclosure are clarified by examples, but the present disclosure should not be exclusively interpreted based on the descriptions of the examples.

[Sample 5]

A forged face member, and a casted body member, were welded, whereby a driver head made of a titanium alloy was obtained. A shaft 6 was obtained by the sheet winding method using a plurality of prepreg sheets. A rubber composition was heated and pressurized in a mold, whereby a grip was obtained. In the forming of the grip, a foam rubber and a non-foam rubber were used. A part of a grip body portion 8a of the grip was made of a foam rubber. The foam rubber was used in an inner layer of the grip body portion 8a. An outer layer of the grip body portion 8a was made of a non-foam rubber. An end cap portion 8b of the grip was made of a non-foam rubber. A formed weight body 20 was covered with a rubber material, and this was set in a mold, pressurized, and heated, whereby a weight member 10 having a cover member 30 made of a vulcanized rubber was obtained. This weight member 10 was attached to a butt portion of the shaft 6, and thereafter, the grip was attached to the shaft 6, whereby a golf club as shown in FIGS. 1 and 2 was obtained.

[Other Samples]

Other samples were obtained in the same manner as that of Sample 5, except for the specifications shown in Tables 1 to 6 below. Note that samples in which the weight of the weight member is indicated as 0 g include no weight member. Respective shafts were produced in such a manner that a flex was not changed by changing the types, shapes, and/or arrangement of prepregs. The head gravity center distance H1 and the lateral moment of inertia Ih were adjusted by changing the wall-thickness distribution of the head and the position of a resin adhered to the inner surface of the head.

Respective specifications and evaluation results of the samples are shown in Tables 1 to 6 below. For comparison, Sample 5 is shown in each table. Methods for measuring the specifications are as explained above.

TABLE 1

Specifications and Evaluation Results of Samples

| | Unit | Sample 1 | Sample 2 | Sample 3 | Sample 4 | Sample 5 | Sample 6 | Sample 7 |
|---|---|---|---|---|---|---|---|---|
| Club length Lc | inch | 45.75 | 45.75 | 45.75 | 45.75 | 45.75 | 45.75 | 45.75 |
| Head weight Wh | g | 196 | 196 | 196 | 196 | 196 | 196 | 196 |
| Shaft weight Ws | g | 40 | 40 | 40 | 40 | 40 | 40 | 40 |
| Grip weight Wg | g | 31 | 31 | 31 | 31 | 31 | 31 | 31 |
| Weight of weight member | g | 0 | 3 | 6 | 8 | 10 | 13 | 16 |
| Weight W1 of butt end region R1 | g | 24 | 27 | 30 | 32 | 34 | 37 | 40 |
| Weight W2 of grip-weight portion | g | 32 | 35 | 38 | 40 | 42 | 45 | 48 |

TABLE 1-continued

Specifications and Evaluation Results of Samples

|  | Unit | Sample 1 | Sample 2 | Sample 3 | Sample 4 | Sample 5 | Sample 6 | Sample 7 |
|---|---|---|---|---|---|---|---|---|
| Weight W3 of shaft-grip-weight portion | g | 72 | 75 | 78 | 80 | 82 | 85 | 88 |
| Club weight Wc | g | 270 | 273 | 276 | 278 | 280 | 283 | 286 |
| W1/W3 | — | 0.33 | 0.36 | 0.38 | 0.40 | 0.41 | 0.44 | 0.45 |
| Ws/Wc | — | 0.15 | 0.15 | 0.14 | 0.14 | 0.14 | 0.14 | 0.14 |
| Wg/W2 | — | 0.97 | 0.89 | 0.82 | 0.78 | 0.74 | 0.69 | 0.65 |
| W1/Ws | — | 0.60 | 0.68 | 0.75 | 0.80 | 0.85 | 0.93 | 1.00 |
| Gravity center ratio T3 of shaft-grip-weight portion | % | 30 | 29 | 28 | 27 | 27 | 26 | 25 |
| Gravity center ratio T2 of grip-weight portion | % | 35 | 32 | 30 | 28 | 27 | 26 | 24 |
| Head gravity center distance H1 | mm | 44.5 | 44.5 | 44.5 | 44.5 | 44.5 | 44.5 | 44.5 |
| Lateral moment of inertia Ih of head | g·cm$^2$ | 4600 | 4600 | 4600 | 4600 | 4600 | 4600 | 4600 |
| Moment of inertia Ic of club | ×10$^3$ g·cm$^2$ | 461 | 486 | 511 | 528 | 544 | 568 | 592 |
| Swing moment of inertia Isw | ×10$^3$ g·cm$^2$ | 5361 | 5369 | 5374 | 5377 | 5380 | 5385 | 5390 |
| Flight distance | yard | 185 | 188 | 189 | 190 | 190 | 190 | 191 |
| Directional stability of hit balls | yard | 11 | 11 | 10 | 10 | 10 | 10 | 9 |
| Catchability | yard | −5 | −4 | −2 | −1 | 0 | 1 | 3 |

TABLE 2

Specifications and Evaluation Results of Samples

|  | Unit | Sample 8 | Sample 9 | Sample 5 | Sample 10 | Sample 11 | Sample 12 |
|---|---|---|---|---|---|---|---|
| Club length Lc | inch | 45.75 | 45.75 | 45.75 | 45.75 | 45.75 | 45.75 |
| Head weight Wh | g | 190 | 195 | 196 | 196 | 198 | 205 |
| Shaft weight Ws | g | 40 | 40 | 40 | 45 | 40 | 40 |
| Grip weight Wg | g | 31 | 31 | 31 | 36 | 31 | 31 |
| Weight of weight member | g | 10 | 10 | 10 | 0 | 10 | 10 |
| Weight W1 of butt end region R1 | g | 34 | 34 | 34 | 28 | 34 | 34 |
| Weight W2 of grip-weight portion | g | 42 | 42 | 42 | 37 | 42 | 42 |
| Weight W3 of shaft-grip-weight portion | g | 82 | 82 | 82 | 82 | 82 | 82 |
| Club weight Wc | g | 274 | 279 | 280 | 280 | 282 | 289 |
| W1/W3 | — | 0.41 | 0.41 | 0.41 | 0.34 | 0.41 | 0.41 |
| Ws/Wc | — | 0.15 | 0.14 | 0.14 | 0.16 | 0.14 | 0.14 |
| Wg/W2 | — | 0.74 | 0.74 | 0.74 | 0.97 | 0.74 | 0.74 |
| W1/Ws | — | 0.85 | 0.85 | 0.85 | 0.62 | 0.85 | 0.85 |
| Gravity center ratio T3 of shaft-grip-weight portion | % | 27 | 27 | 27 | 27 | 27 | 27 |

TABLE 2-continued

Specifications and Evaluation Results of Samples

| | Unit | Sample 8 | Sample 9 | Sample 5 | Sample 10 | Sample 11 | Sample 12 |
|---|---|---|---|---|---|---|---|
| Gravity center ratio T2 of grip-weight portion | % | 27 | 27 | 27 | 27 | 27 | 27 |
| Head gravity center distance H1 | mm | 43.3 | 44.3 | 44.5 | 44.5 | 44.9 | 46.3 |
| Lateral moment of inertia Ih of head | g · cm² | 4240 | 4540 | 4600 | 4600 | 4720 | 5140 |
| Moment of inertia Ic of club | ×10³ g · cm² | 540 | 543 | 544 | 504 | 545 | 550 |
| Swing moment of inertia Isw | ×10³ g · cm² | 5233 | 5356 | 5380 | 5436 | 5429 | 5601 |
| Flight distance | yard | 186 | 188 | 190 | 182 | 189 | 190 |
| Directional stability of hit balls | yard | 11 | 11 | 10 | 14 | 13 | 13 |
| Catchability | yard | 6 | 1 | 0 | −5 | −2 | −5 |

TABLE 3

Specifications and Evaluation Results of Samples

| | Unit | Sample 13 | Sample 5 | Sample 14 | Sample 15 |
|---|---|---|---|---|---|
| Club length Lc | inch | 45.75 | 45.75 | 45.75 | 45.75 |
| Head weight Wh | g | 196 | 196 | 196 | 196 |
| Shaft weight Ws | g | 38 | 40 | 45 | 50 |
| Grip weight Wg | g | 31 | 31 | 31 | 31 |
| Weight of weight member | g | 12 | 10 | 5 | 0 |
| Weight W1 of butt end region R1 | g | 36 | 34 | 29 | 24 |
| Weight W2 of grip-weight portion | g | 44 | 42 | 37 | 32 |
| Weight W3 of shaft-grip-weight portion | g | 82 | 82 | 82 | 82 |
| Club weight Wc | g | 280 | 280 | 280 | 280 |
| W1/W3 | — | 0.44 | 0.41 | 0.35 | 0.29 |
| Ws/Wc | — | 0.14 | 0.14 | 0.16 | 0.18 |
| Wg/W2 | — | 0.70 | 0.74 | 0.84 | 0.97 |
| W1/Ws | — | 0.95 | 0.85 | 0.64 | 0.48 |
| Gravity center ratio T3 of shaft-grip-weight portion | % | 26 | 27 | 30 | 33 |
| Gravity center ratio T2 of grip-weight portion | % | 26 | 27 | 31 | 35 |
| Head gravity center distance H1 | mm | 44.5 | 44.5 | 44.5 | 44.5 |
| Lateral moment of inertia Ih of head | g · cm² | 4600 | 4600 | 4600 | 4600 |
| Moment of inertia Ic of club | ×10³ g · cm² | 558 | 544 | 510 | 476 |
| Swing moment of inertia Isw | ×10³ g · cm² | 5366 | 5380 | 5417 | 5451 |
| Flight distance | yard | 194 | 190 | 186 | 183 |
| Directional stability of hit balls | yard | 9 | 10 | 14 | 17 |
| Catchability | yard | 1 | 0 | −3 | −5 |

TABLE 4

Specifications and Evaluation Results of Samples

| | Unit | Sample 16 | Sample 5 | Sample 17 | Sample 18 |
|---|---|---|---|---|---|
| Club length Lc | inch | 45.75 | 45.75 | 45.75 | 45.75 |
| Head weight Wh | g | 196 | 196 | 196 | 196 |
| Shaft weight Ws | g | 40 | 40 | 40 | 40 |
| Grip weight Mg | g | 29 | 31 | 36 | 41 |
| Weight of weight member | g | 12 | 10 | 5 | 0 |
| Weight W1 of butt end region R1 | g | 35 | 34 | 32 | 30 |
| Weight W2 of grip-weight portion | g | 42 | 42 | 42 | 42 |
| Weight W3 of shaft-grip-weight portion | g | 82 | 82 | 82 | 82 |
| Club weight Mc | g | 280 | 280 | 280 | 280 |
| W1/W3 | — | 0.43 | 0.41 | 0.39 | 0.37 |
| Ws/Wc | — | 0.14 | 0.14 | 0.14 | 0.14 |
| Wg/W2 | — | 0.69 | 0.74 | 0.86 | 0.98 |
| W1/Ws | — | 0.88 | 0.85 | 0.81 | 0.76 |
| Gravity center ratio T3 of shaft-grip-weight portion | % | 27 | 27 | 27 | 28 |
| Gravity center ratio T2 of grip-weight portion | % | 26 | 27 | 31 | 35 |
| Head gravity center distance H1 | mm | 44.5 | 44.5 | 44.5 | 44.5 |
| Lateral moment of inertia Ih of head | g · cm² | 4600 | 4600 | 4600 | 4600 |
| Moment of inertia Ic of club | ×10³ g · cm² | 547 | 544 | 537 | 531 |
| Swing moment of inertia Isw | ×10³ g · cm² | 5379 | 5380 | 5384 | 5386 |
| Flight distance | yard | 191 | 190 | 189 | 188 |
| Directional stability of hit balls | yard | 10 | 10 | 11 | 11 |
| Catchability | yard | 0 | 0 | −1 | −1 |

TABLE 5

Specifications and Evaluation Results of Samples

| | Unit | Sample 19 | Sample 20 | Sample 21 | Sample 10 | Sample 5 | Sample 22 |
|---|---|---|---|---|---|---|---|
| Club length Lc | inch | 44.75 | 45.00 | 45.50 | 45.75 | 45.75 | 46.00 |
| Head weight Wh | g | 196 | 196 | 196 | 196 | 196 | 196 |
| Shaft weight Ws | g | 37 | 38 | 39 | 45 | 40 | 41 |
| Grip weight Wg | g | 31 | 31 | 31 | 36 | 31 | 31 |
| Weight of weight member | g | 10 | 10 | 10 | 0 | 10 | 10 |
| Weight W1 of butt end region R1 | g | 34 | 34 | 34 | 28 | 34 | 34 |
| Weight W2 of grip-weight portion | g | 42 | 42 | 42 | 37 | 42 | 42 |
| Weight W3 of shaft-grip-weight portion | g | 79 | 80 | 81 | 82 | 82 | 83 |
| Club weight Pc | g | 277 | 278 | 279 | 280 | 280 | 281 |
| W1/W3 | — | 0.43 | 0.43 | 0.42 | 0.34 | 0.41 | 0.41 |
| Ws/Wc | — | 0.13 | 0.14 | 0.14 | 0.16 | 0.14 | 0.15 |
| Wg/W2 | — | 0.74 | 0.74 | 0.74 | 0.97 | 0.74 | 0.74 |
| W1/Ws | — | 0.92 | 0.89 | 0.87 | 0.62 | 0.85 | 0.83 |
| Gravity center ratio T3 of shaft-grip-weight portion | % | 27 | 27 | 27 | 27 | 27 | 27 |
| Gravity center ratio T2 of grip-weight portion | % | 27 | 27 | 27 | 27 | 27 | 27 |
| Head gravity center distance H1 | mm | 44.5 | 44.5 | 44.5 | 44.5 | 44.5 | 44.5 |
| Lateral moment of inertia Ih of head | $g \cdot cm^2$ | 4600 | 4600 | 4600 | 4600 | 4600 | 4600 |
| Moment of inertia Ic of club | $\times 10^3\ g \cdot cm^2$ | 515 | 523 | 536 | 504 | 544 | 552 |
| Swing moment of inertia Isw | $\times 10^3\ g \cdot cm^2$ | 5152 | 5211 | 5320 | 5418 | 5380 | 5441 |
| Flight distance | yard | 184 | 186 | 189 | 182 | 190 | 189 |
| Directional stability of hit balls | yard | 6 | 7 | 8 | 14 | 10 | 12 |
| Catchability | yard | −3 | −2 | −1 | −5 | 0 | 1 |

TABLE 6

Specifications and Evaluation Results of Samples

| | Unit | Sample 23 | Sample 24 | Sample 5 | Sample 10 | Sample 25 | Sample 26 |
|---|---|---|---|---|---|---|---|
| Club length Lc | inch | 45.75 | 45.75 | 45.75 | 45.75 | 45.75 | 45.75 |
| Head weight Wh | g | 196 | 196 | 196 | 196 | 196 | 196 |
| Shaft weight Ws | g | 40 | 40 | 40 | 45 | 40 | 40 |
| Grip weight Wg | g | 31 | 31 | 31 | 36 | 31 | 31 |
| Weight of weight member | g | 10 | 10 | 10 | 0 | 0 | 10 |
| Weight W1 of butt end region R1 | g | 34 | 34 | 34 | 28 | 24 | 34 |
| Weight W2 of grip-weight portion | g | 42 | 42 | 42 | 37 | 32 | 42 |
| Weight W3 of shaft-grip-weight portion | g | 82 | 82 | 82 | 82 | 72 | 82 |
| Club weight Mc | g | 280 | 280 | 280 | 280 | 270 | 280 |
| W1/W3 | — | 0.41 | 0.41 | 0.41 | 0.34 | 0.33 | 0.41 |
| Ws/Wc | — | 0.14 | 0.14 | 0.14 | 0.16 | 0.15 | 0.14 |
| Wg/W2 | — | 0.74 | 0.74 | 0.74 | 0.97 | 0.97 | 0.74 |
| W1/Ws | — | 0.85 | 0.85 | 0.85 | 0.62 | 0.60 | 0.85 |

TABLE 6-continued

Specifications and Evaluation Results of Samples

| | Unit | Sample 23 | Sample 24 | Sample 5 | Sample 10 | Sample 25 | Sample 26 |
|---|---|---|---|---|---|---|---|
| Gravity center ratio T3 of shaft-grip-weight portion | % | 27 | 27 | 27 | 27 | 30 | 27 |
| Gravity center ratio T2 of grip-weight portion | % | 27 | 27 | 27 | 27 | 35 | 27 |
| Head gravity center distance H1 | mm | 42.2 | 43.8 | 44.5 | 44.5 | 45.5 | 47.1 |
| Lateral moment of inertia Ih of head | $g \cdot cm^2$ | 4255 | 4495 | 4600 | 4600 | 4750 | 4990 |
| Moment of inertia Ic of club | $\times 10^3 \, g \cdot cm^2$ | 544 | 544 | 544 | 504 | 461 | 544 |
| Swing moment of inertia Isw | $\times 10^3 \, g \cdot cm^2$ | 5380 | 5380 | 5380 | 5418 | 5361 | 5380 |
| Flight distance | yard | 186 | 187 | 190 | 182 | 184 | 192 |
| Directional stability of hit balls | yard | 10 | 10 | 10 | 14 | 11 | 10 |
| Catchability | yard | 6 | 2 | 0 | −5 | −8 | −4 |

[Evaluation Method]

Evaluations were carried out in the following way.

[Tester]

Ten right-handed golfers who were classified in the above-described Category A carried out tests.

[Flight Distance]

"Flight distance" is a distance traveled by a hit ball up to a point where the hit ball reaches finally, which includes run. Each of the above-described ten testers shot five golf balls with each club. As to each sample, the average value of all pieces of flight distance data is shown in Tables above.

[Directional Stability of Hit Balls]

Each of the above-described ten testers shot five golf balls with each club. A distance of deviation rightward or leftward from the target direction was measured. The distance of deviation is regarded as a plus value, irrespective of whether the deviation was rightward or leftward. As to each sample, the average value of the deviation distances is shown in Tables above.

[Catchability]

In the above-described test data regarding the directional stability of hit balls, a deviation distance when the deviation was rightward is regarded as a minus value, and a deviation distance when the deviation was leftward is regarded as a plus value. As to each sample, the average value of the deviation distances is shown in Tables above. A greater average value indicates that the hit balls were deviated more leftward. A greater average value indicates that the catchability is better.

Regarding the data shown in Table 1, changes in the weight of the weight member led to changes in the values of W1/W3, Wg/W2, W1/Ws, the gravity center ratio T2, the gravity center ratio T3, and the like. As shown in the results in Table 1, an increase in the anti-off-plane moment led to the enhancement of the on-plane effect, thereby making the directional stability of hit balls excellent. Further, the on-plane effect and the swing MI reduction effect allowed the flight distance to increase, in spite of an increase in the club weight. Further, an increase in the anti-off-plane moment led to the enhancement of the square impact effect, thereby making the catchability excellent.

Regarding the data shown in Table 2, the head weight Wh and the lateral moment of inertia Ih were changed. As indicated by the results shown in Table 2, even when the head weight Wh was increased and thus the club weight Wc was increased, no decrease was recognized in the flight distance, which was achieved by the on-plane effect and the swing MI reduction effect. Furthermore, the square impact effect made the catchability excellent, even when the head weight Wh and the lateral moment of inertia Ih were increased.

Regarding the data shown in Table 3, the values of W1/W3, Wg/W2, W1/Ws, the gravity center ratio T2, the gravity center ratio T3, and the like were changed, while no change was made in the club weight Wc. As indicated by the results shown in Table 3, an increase in the anti-off-plane moment led to the enhancement of the on-plane effect and the square impact effect.

Regarding the data shown in Table 4, the weight of the weight member and the grip weight Wg were changed, while no change was made in the weight W2 of the grip-weight portion. As indicated by the results shown in Table 4, an increase in the anti-off-plane moment led to the enhancement of the on-plane effect and the square impact effect.

Regarding the data shown in Table 5, changes in the shaft length Ls led to changes in the club length Lc. The deterioration in the directional stability of hit balls was suppressed even with a longer club. Thus, the flight distance was increased with a longer club. For reference, the data of Sample 10 were also shown in Table 5.

Regarding the data shown in Table 6, the head gravity center distance H1 was changed. The catchability was excellent even when the head gravity center distance H1 was great, which was achieved by the square impact effect brought by the anti-off-plane moment. For reference, the data of Sample 10 were also shown in Table 6.

As these evaluation results indicate, the superiority of the present disclosure is obvious.

The following clauses are disclosed regarding the above-described embodiments.

[Clause 1]
A golf club including:
a head;
a shaft including a tip end and a butt end;
a grip; and
a weight member that is located in a butt end region having a distance from a butt end of the grip of less than or equal to 100 mm, wherein
the grip and the weight member constitute a grip-weight portion,
the shaft, the grip, and the weight member constitute a shaft-grip-weight portion,
the golf club has a weight of less than 295 g,
the head has a weight of greater than or equal to 195 g,
the grip-weight portion has a weight of greater than or equal to 40 g,
the head has a gravity center distance of greater than or equal to 44.5 mm, and
W1/W3 is greater than or equal to 0.40, where W1 represents a weight (g) of the butt end region, and W3 represents a weight (g) of the shaft-grip-weight portion.
[Clause 2]
The golf club according to clause 1, wherein the head has a lateral moment of inertia of greater than or equal to 4500 (g·cm$^2$).
[Clause 3]
The golf club according to clause 1 or 2, wherein the shaft has a weight of less than or equal to 40 g.
[Clause 4]
The golf club according to any one of clauses 1 to 3, wherein the golf club has a length of greater than or equal to 45.0 inches.
[Clause 5]
The golf club according to any one of clauses 1 to 4, wherein the golf club has a swing moment of inertia Isw of less than or equal to 5450×10$^3$ (g·cm$^2$), the swing moment of inertia Isw (g·cm$^2$) being calculated by the following formula (1):

$$Isw = Wc \times (Lg+40)^2 + Ic \qquad (1),$$

where Wc represents the club weight (g), Lg represents a distance (cm) in an axial direction between the butt end of the grip and a center of gravity of the golf club, and Ic represents a moment of inertia (g·cm$^2$) of the golf club about the center of gravity of the golf club.

The foregoing description describes only examples, and various changes can be made without departing from the essence of the present disclosure.

What is claimed is:
1. A golf club comprising:
a head;
a shaft including a tip end and a butt end;
a grip; and
a weight member that is located in a butt end region having a distance from a butt end of the grip of less than or equal to 100 mm, wherein
the grip and the weight member constitute a grip-weight portion,
the shaft, the grip, and the weight member constitute a shaft-grip-weight portion,
the golf club has a weight of less than 295 g,
the head has a weight of greater than or equal to 195 g,
the grip-weight portion has a weight of greater than or equal to 40 g,
the head has a gravity center distance of greater than or equal to 44.5 mm, wherein the gravity center distance is the length of a perpendicular line from a center line of the shaft to a center of gravity of the head, and
W1/W3 is greater than or equal to 0.40, where W1 represents a weight (g) of the butt end region, and W3 represents a weight (g) of the shaft-grip-weight portion.

2. The golf club according to claim 1, wherein the head has a lateral moment of inertia of greater than or equal to 4500 (g·cm$^2$).

3. The golf club according to claim 1, wherein the shaft has a weight of less than or equal to 40 g.

4. The golf club according to claim 1, wherein the golf club has a length of greater than or equal to 45.0 inches.

5. The golf club according to claim 1, wherein the golf club has a swing moment of inertia Isw of less than or equal to 5450×10$^3$ (g·cm$^2$), the swing moment of inertia Isw (g·cm$^2$) being calculated by the following formula (1):

$$Isw = Wc \times (Lg+40)^2 + Ic \qquad (1),$$

where Wc represents the club weight (g), Lg represents a distance (cm) in an axial direction between the butt end of the grip and a center of gravity of the golf club, and Ic represents a moment of inertia (g·cm$^2$) of the golf club about the center of gravity of the golf club.

6. The golf club according to claim 5, wherein the moment of inertia Ic of the golf club about the center of gravity of the golf club is greater than or equal to 500×10$^3$ (g·cm$^2$).

7. The golf club according to claim 6, wherein the golf club has a length of less than or equal to 46 inches.

8. The golf club according to claim 5, wherein the shaft-grip-weight portion has a gravity center ratio T3 of less than or equal to 27%, the gravity center ratio T3 of the shaft-grip-weight portion being calculated by the following formula:

$$T3 = (D3/L3) \times 100,$$

where D3 represents a distance from the butt end of the grip to a center of gravity of the shaft-grip-weight portion, and L3 represents a distance from the butt end of the grip to the tip end of the shaft.

9. The golf club according to claim 8, wherein
the grip-weight portion has a gravity center ratio T2 of less than or equal to 28%, the gravity center ratio T2 of the grip-weight portion being calculated by the following formula:

$$T2 = (D2/L2) \times 100,$$

where D2 represents a distance from the butt end of the grip to a center of gravity of the grip-weight portion, and L2 represents a length of the grip.

10. The golf club according to claim 9, wherein the grip has a weight of less than or equal to 35 g.

11. The golf club according to claim 10, wherein
the grip includes a grip body portion that has a cylindrical shape, and an end cap portion that closes an opening of the grip body portion on one end side and forms a butt end face of the grip, and
a part of the grip body portion is made of a foam rubber.

12. The golf club according to claim 10, wherein
the grip includes a grip body portion that has a cylindrical shape, and an end cap portion that closes an opening of the grip body portion on one end side and forms a butt end face of the grip, and
the end cap portion is made of a non-foam rubber exclusively, and the grip body portion includes a foam rubber portion made of a foam rubber.

13. The golf club according to claim 10, wherein
the grip includes a grip body portion that has a cylindrical shape, and an end cap portion that closes an opening of the grip body portion on one end side and forms a butt end face of the grip, and
the end cap portion has a specific gravity greater than an average specific gravity of the grip body portion.

14. The golf club according to claim 9, wherein the grip has a weight of less than or equal to 33 g.

15. The golf club according to claim 9, wherein the grip has a weight of less than or equal to 31 g.

16. The golf club according to claim 9, wherein the weight member has a length in an axial direction of greater than or equal to 5 mm and less than or equal to 50 mm.

17. The golf club according to claim 9, wherein a distance between a tip-end-side end of the weight member and the butt end of the grip is greater than or equal to 15 mm and less than or equal to 70 mm.

\* \* \* \* \*